(12) United States Patent
Paulsen et al.

(10) Patent No.: US 9,177,689 B2
(45) Date of Patent: *Nov. 3, 2015

(54) HIGH DENSITY AND HIGH VOLTAGE STABLE CATHODE MATERIALS FOR SECONDARY BATTERIES

(75) Inventors: Jens Martin Paulsen, Daejeon (KR); Hyunjoo Je, Gyeonggi (KR); Maxime Blangero, Chungnam (KR)

(73) Assignee: Umicore, Brussels (BE)

( * ) Notice: Subject to any disclaimer, the term of this patent is extended or adjusted under 35 U.S.C. 154(b) by 411 days.

This patent is subject to a terminal disclaimer.

(21) Appl. No.: 13/308,704

(22) Filed: Dec. 1, 2011

(65) Prior Publication Data

US 2012/0134914 A1 May 31, 2012

Related U.S. Application Data

(63) Continuation-in-part of application No. 12/374,532, filed as application No. PCT/EP2008/000313 on Jan.

(Continued)

(30) Foreign Application Priority Data

Jun. 29, 2007 (EP) .................................... 07012789

(51) Int. Cl.
 H01M 4/52 (2010.01)
 H01B 1/08 (2006.01)
 C01G 51/00 (2006.01)

(52) U.S. Cl.
 CPC *H01B 1/08* (2013.01); *C01G 51/44* (2013.01); *C01P 2002/50* (2013.01);

(Continued)

(58) Field of Classification Search
 CPC ...... H01M 4/505; H01M 4/485; H01M 4/131
 USPC .............................................. 429/209
 See application file for complete search history.

(56) References Cited

U.S. PATENT DOCUMENTS 6,040,090 A 3/2000 Sunagawa et al.
6,372,385 B1 4/2002 Kweon et al.
(Continued)

FOREIGN PATENT DOCUMENTS

EP 1189296 3/2002
EP 1556915 5/2004
(Continued)

OTHER PUBLICATIONS

Paulsen et al., "Core-Shell Cathode Material with Size-Dependent Composition," Electrochemical and Solid State Letters, vol. 10, No. 4, (2007), pp. A101-A105.

*Primary Examiner* — Patrick Ryan
*Assistant Examiner* — Lucas J O'Donnell
(74) *Attorney, Agent, or Firm* — Brinks Gilson & Lione

(57) ABSTRACT

Disclosed is a cathode active material and a method to produce the same at low cost. The cathode powder comprises modified $LiCoO_2$, and possibly a second phase which is $LiM'O_2$ where M' is Mn, Ni, Co with a stoichiometric ratio Ni:Mn≥1. The modified $LiCoO_2$ is Ni and Mn bearing and has regions of low and high manganese content, where regions with high manganese content are located in islands on the surface. The cathode material has high cycling stability, a very high rate performance and good high temperature storage properties.

42 Claims, 9 Drawing Sheets

Related U.S. Application Data 17, 2008, application No. 13/308,704, which is a continuation-in-part of application No. PCT/EP2011/060681, filed on Jun. 27, 2011.

(60) Provisional application No. 60/929,613, filed on Jul. 5, 2007, provisional application No. 60/897,823, filed on Jan. 29, 2007, provisional application No. 61/359,484, filed on Jun. 29, 2010.

(52) U.S. Cl.
CPC ........ *C01P 2004/03* (2013.01); *C01P 2004/52* (2013.01); *C01P 2004/53* (2013.01); *C01P 2006/11* (2013.01); *Y10T 428/2982* (2015.01)

(56) References Cited

U.S. PATENT DOCUMENTS 7,078,128 B2   7/2006  Lu et al.

2006/0071198 A1   4/2006   Paulsen et al.
2006/0257745 A1   11/2006   Choi et al.
2007/0122705 A1*  5/2007   Paulsen et al. ............. 429/231.3
2007/0212608 A1*  9/2007   Liu et al. .................... 429/231.1
2007/0218363 A1*  9/2007   Paulsen et al. ............. 429/231.3
2008/0193834 A1*  8/2008   Murakami et al. ............ 429/129
2009/0220860 A1   9/2009   Xi et al.
2010/0112445 A1   5/2010   Park et al.

FOREIGN PATENT DOCUMENTS

| | | |
|---|---|---|
| EP | 1716609 | 7/2005 |
| KR | 20010002784 | 1/2001 |
| WO | WO 2004/040677 | 5/2004 |
| WO | WO 2005/056480 | 6/2005 |
| WO | WO 2005/064715 | 7/2005 |

* cited by examiner a) LCO-5 b) Ex 5a c) CEx 5b

HIGH DENSITY AND HIGH VOLTAGE STABLE CATHODE MATERIALS FOR SECONDARY BATTERIES

This application is a continuation-in-part of U.S. patent application Ser. No. 12/374,532, filed Jan. 21, 2009, which is a national stage application of PCT/EP2008/000313, filed Jan. 17, 2008, which claims the benefit of U.S. Provisional Application No. 60/897,823, filed Jan. 29, 2007, European Patent Application No. 07012789.9, filed Jun. 29, 2007, and U.S. Provisional Application No. 60/929,613, filed Jul. 5, 2007, the entire contents of each of which is hereby incorporated by reference. This application also claims the benefit of PCT/EP2011/060681, filed Jun. 27, 2011, which claims priority to U.S. Provisional Application No. 61/359,484, filed Jun. 29, 2010, the entire contents of each of which is hereby incorporated by reference.

BACKGROUND OF THE INVENTION

The present invention relates to a powderous lithium transition metal oxide, containing a special type of Mn and Ni bearing $LiCoO_2$. The cathode powder can be prepared at large scale by a low-cost process. More specifically, the preparation is the sintering of a mixture of a cobalt containing precursor, like $LiCoO_2$, a Ni—Mn—Co containing precursor, like mixed hydroxide MOOH, and $Li_2CO_3$. The sintering temperature is high enough to allow for an exchange of cations between the $LiCoO_2$ and Li—Ni—Mn—Co oxide phases being formed, which results in a very specific morphology with a compositional gradient of the different transition metals. The lithium transition metal oxide powder can be used as a cathode active material in rechargeable lithium batteries.

Despite of some inherent limitations like poor safety and high cost $LiCoO_2$ still is the most applied cathode material for rechargeable lithium batteries. There is a strong demand driven by customer expectation to increase the energy density of rechargeable lithium batteries. One way to improve the energy density is to increase the charge voltage, which requires more robust cathode materials which can be charged at higher voltage. Problems which appear or become more severe if the charging voltage is increased are (a) low safety, (b) poor storage properties during storage of charged batteries at elevated temperature and (c) poor cycling stability. Numerous approaches have been disclosed to address these problems. Partial improvements have been achieved but the basic problems have not been fully resolved.

Beside the demand to increase the energy density, it is essential that rechargeable batteries meet the power requirements. That means that the battery as a whole and particularly the active cathode material itself has a sufficient high rate performance.

There exist general trends. Careful studying of published results on cathode materials allows to better understand the limitations of $LiCoO_2$ based rechargeable lithium batteries.

One basic limitation originates from the surface area dilemma. Increase rate performance (i.e. high power) can be met by increasing the surface area because the solid-state lithium diffusion length can be decreased; which results in an improved rate performance. However, a high surface area increases the area where unwanted side reactions between electrolyte and charged cathode take place. These side reactions are the course of poor safety, poor cycling stability at elevated voltage and of poor storage properties of charged cathode at elevated temperature. Furthermore, high surface area materials tend to have a low packing density which reduces the volumetric energy density.

Another basic limitation originates from the cobalt stoichiometry. Lithium-nickel-manganese-cobalt oxide based cathode materials (like $LiMn_{1/3}Ni_{1/3}Co_{1/3}O_2$) have higher stability against reactions between electrolyte and cathode than $LiCoO_2$, and the raw material cost is lower, but these materials suffer from a lower volumetric energy density and these materials typically have a lower lithium diffusion constant.

It can be concluded that there exist basic limitations in:
Surface area: Low surface area cathode materials are desired to achieve high safety, improved density and high stability during storage; however, the surface area cannot be lowered too much because this will lower the rate performance.
Composition: $LiMO_2$ cathodes, where M dominantly is cobalt is desired to achieve high lithium diffusion rate and high volumetric energy density; however a high content of cobalt causes poor safety properties, increased cost and an inferior high voltage stability.

A solution to this dilemma would be to increase the diffusion constant. Increased D would allow to lower the surface area without losing rate performance.

$LiMO_2$, where M=Ni—Mn—Co with Ni:Mn>1, has been previously disclosed. U.S. Pat. No. 6,040,090 (Sanyo), for example, discloses a wide range of compositions $LiMO_2$ (M=Mn, Ni, Co) including $LiMO_2$ with Ni:Mn>1. The patent application discloses that $LiMO_2$ has a high degree of crystallinity (small HWFM of peaks in the X-ray diffraction pattern). $LiCoO_2$ doped with Ni and Mn has for example been disclosed in U.S. Pat. No. 7,078,128. U.S. Pat. No. 7,078,128 discloses $LiCoO_2$, doped by equal amounts of Ni and Mn is a preferred implementation.

European patent application EP1716609 A1 discloses a $LiMO_2$ based active cathode material where the composition of the particles depends on the size of the particles, particularly, the cobalt content of particles decreases with decreasing size of the particles. The decrease of cobalt content originates from core-shell structured particles, where the Mn—Ni containing shell has the same thickness, covering a $LiCoO_2$ core. As a result, if the particles are small, the $LiCoO_2$ core is small and the cobalt content of the whole particle is low.

European patent application EP1556915 A1 discloses a $LiMO_2$ with a gradient of transition metal composition. The gradient originates from a mixed hydroxide shell, covering the core which has significantly different metal composition. In a preferred implementation the core is $LiCoO_2$. After sintering a gradient of transition metal composition with a radial change of stoichiometry is achieved, and a $LiMO_2$ shell covers a $LiCoO_2$ based core. During sintering, cobalt diffuses from the $LiCoO_2$ core to the $LiMO_2$ shell. At the same time much less Ni diffuses from the $LiMO_2$ shell into the $LiCoO_2$ core. Therefore the shell swells and the $LiCoO_2$ core contracts. A swelling shell covering a shrinking core typically causes the creation of voids between shell and core. These voids are highly undesired.

BRIEF DESCRIPTION OF THE DRAWINGS

FIG. 1a is an SEM image showing the powder of LCO-1.
FIG. 1b is an SEM image of the powder of Example 1a.

FIG. 8a is an SEM image showing the powder of LCO-5.

FIG. 8b is 2 SEM images showing the powder of Example 5a.

FIG. 8c is an SEM image showing the powder of Example 5b.

Figure 1:
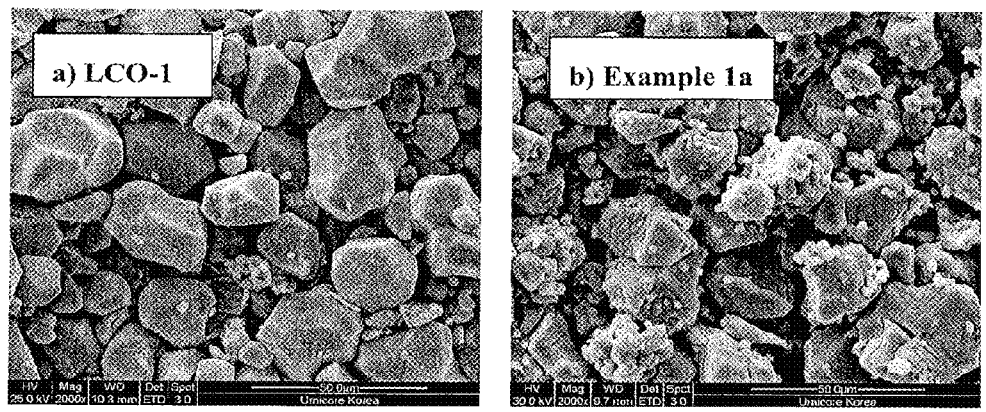

It is an object of the present invention to define a cathode material having a high rate performance, and showing high stability during extended cycling at high charge voltage. The high temperature storage properties are also improved.

SUMMARY

Viewed from a first aspect, the invention can provide a lithium metal oxide powder for use as a cathode material in a rechargeable battery, the powder having an electrical conductivity of less than $10^{-5}$ S/cm when pressed with 63.7 MPa at 25° C., and the powder having a reversible electrode capacity of at least 180 mAh/g, when used as an active component in a cathode which is cycled between 3.0 and 4.5 V vs. $Li^+/Li$ at a discharge rate of C/10 at 25° C. In certain embodiments the electrical conductivity is less than $10^{-6}$ S/cm, or even less than $10^{-7}$ S/cm. In other embodiments the powder has a reversible electrode capacity of at least 180 mAh/g at a discharge rate of C/5 at 25° C., or even at least 180 mAh/g at a discharge rate of 1C at 25° C. In one embodiment the lithium metal oxide powder comprises at least 50 mol % Co, or at least 70 mol % Co, or even at least 90 mol % Co.

In yet another embodiment the lithium metal oxide powder has a pressed density of at least 3.5 g/cm³. In other embodiments the pressed density is at least 3.7 g/cm³, or even at least 3.8 g/cm³. The pressed density is measured by applying 1.58 Ton/cm² on the as-obtained powder.

Measurement of the electrical conductivity is performed under an applied pressure of 63.7 MPa. In the description and claims the value of 63 MPa is also mentioned as round-off, when the actual pressure of 63.7 MPa is applied.

Viewed from a second aspect, the invention can provide a lithium metal oxide powder for use as a cathode material in a rechargeable battery, the powder having an electrical conductivity of less than $10^{-5}$ S/cm, when pressed with 63.7 MPa at 25° C., and the powder having a reversible electrode capacity of at least 200 mAh/g and an energy fading inferior to 60% when used as an active component in a cathode which is cycled between 3.0 and 4.6 V vs. $Li^+/Li$ at a discharge rate of 0.5C at 25° C. In certain embodiments the electrical conductivity is less than $10^{-6}$ S/cm, or even less than $10^{-7}$ S/cm. In certain embodiments the powder has an energy fading inferior to 40% or even inferior to 30% when used as an active component in a cathode which is cycled between 3.0 and 4.6 V vs. $Li^+/Li$ at a discharge rate of 0.5C at 25° C. In other embodiments the powder has a reversible electrode capacity of at least 200 mAh/g at a discharge rate of 1C at 25° C., and the same energy fading values. In one embodiment the lithium metal oxide powder comprises at least 50 mol % Co, or at least 70 mol % Co, or even at least 90 mol % Co.

The lithium metal oxide powder of the two embodiments above may consist of a core and a shell, wherein the shell has an electrical conductivity being less than $1*10^{-6}$ S/cm, and preferably less than $1*10^{-7}$ S/cm or even less than $1*10^{-8}$ S/cm, and wherein the conductivity of the shell is less than the conductivity of the core of the lithium metal oxide powder. In one embodiment at least 98 mol % of the metals in the lithium metal oxide powder consist either of the elements Li, Mn, Ni and Co, or of the elements Li, Mn, Fe, Ni, Co and Ti. In another embodiment at least 98 mol % of the metals in both the shell and the core consist either of the elements Li, Mn, Ni and Co, or of the elements Li, Mn, Fe, Ni, Co and Ti.

The lithium metal oxide powder of the two embodiments may have a general formula x $LiCoO_2.(1-x)MO_y$, where $0.1<x<1$, $0.5<y\leq2$ and M consists of Li and M', wherein $M'=Ni_aMn_bTi_c$, with $0\leq c\leq 0.1$, $a>b$ and $a+b+c=1$. In one embodiment $0.9<x<1$, making it easier to obtain a homogeneous sintered material, and still obtaining a low conductivity end product.

Viewed from a third aspect, the invention can provide a lithium metal oxide powder for use as a cathode material in a rechargeable battery, the powder having an electrical conductivity of less than $10^{-5}$ S/cm, and preferably less than $10^{-6}$ S/cm or even less than $10^{-7}$ S/cm, when pressed with 63.7 MPa at 25° C., and the powder having a 10C rate performance of at least 90%, preferably at least 95% (discharge capacity measured at 10C rate versus 0.1C rate, expressed in %), and an energy fading inferior to 10% and preferably inferior to 7%, when used as an active component in a cathode which is cycled between 3.0 and 4.4 V vs. $Li^+/Li$. In one embodiment the lithium metal oxide powder may have an electrical conductivity of less than $10^{-5}$ S/cm, and preferably less than $10^{-6}$ S/cm or even less than $10^{-7}$ S/cm, when pressed with 63.7 MPa at 25° C., and the powder has a 20C rate performance of at least 85%, preferably at least 90% (discharge capacity measured at 20C rate versus 0.1C rate, expressed in %) and an energy fading inferior to 10% and preferably inferior to 7% when used as an active component in a cathode which is cycled between 3.0 and 4.4 V vs. $Li^+/Li$. This powder may have an average discharge voltage superior to 3.7V, preferably 3.75V and most preferably 3.77V when cycled at 20C-rate between 3.0 and 4.4 V vs. $Li^+/Li$. In one embodiment, the powder may have the general formula x $LiCoO_2.(1-x)M_yO_z$, wherein $0.1<x<1$, $0.5<z/y\leq2$ and M consisting of Li and M', wherein $M'=Ni_aMn_bCo_cTi_dMg_e$, with $a+b+c+d+e=1$, $a+b>0.5$ and $c\geq 0$, $d\geq 0$, $e\geq 0$. In one embodiment $0.9<x<1$, making it easier to obtain a homogeneous sintered material, and still obtaining a low conductivity end product.

Viewed from a fourth aspect, the invention can provide a method for preparing the lithium metal oxide powders described above, comprising the steps of:

providing a mixture of $LiCoO_2$ powder and either:

a Li—Ni—Mn—Co-oxide or a Ni—Mn—Co comprising powder, and a Li-comprising compound, preferably lithium carbonate, the mixture comprising more than 90 wt %, and preferably at least 95 wt % of $LiCoO_2$ powder, and sintering the mixture at a temperature T of at least 910° C., and preferably at least 950° C., for a time t between 1 and 48 hrs, wherein the quantity of the Li-comprising compound in the mixture is selected to obtain an insulating lithium metal oxide powder having a conductivity of less than $10^{-5}$ S/cm, preferably less than $10^{-6}$ S/cm and most preferably less than $10^{-7}$ S/cm, when pressed with 63.63.77 MPa at 25° C. This method can yield a powderous lithium transition metal oxide, comprising Mn and Ni bearing $LiCoO_2$ particles, where the particles have Mn and Ni enriched islands on their surface, said islands comprising at least 5 mol %, and preferably at least 10 mol % of Mn.

In one embodiment, the $LiCoO_2$ powder further comprises either one or more of Al, Mg and Ti and is prepared by sintering a mixture of a doped Co precursor, such as $Co(OH)_2$ or $Co_3O_4$ doped with either one or more of Al, Mg and Ti, and a Li precursor, such as $Li_2CO_3$. The content of either one or more of Al, Mg and Ti may be between 0.1 and 1 mol %, or between 0.25 and 1 mol %.

In another embodiment, the mixture consists of this pure or doped $LiCoO_2$ powder and either one or more of a Ni—Mn—Co hydroxide, a Ni—Mn—Co oxyhydroxide, a Ni—Mn—Co carbonate and a Ni—Mn—Co oxycarbonate.

In another embodiment of this method, the quantity of the Li-comprising compound, such as lithium carbonate, is selected such that the Li/M ratio is less than 0.1 mol/mol, where the Li/M molar ratio relates the Li addition (by the Li-comprising compound) to the transition metal content in the whole of $LiCoO_2$ and MOOH with M=Ni, Mn and Co, which corresponds to the transition metal content in the finally obtained lithium metal oxide powder. It can also be less than 0.05 mol/mol or even less than 0.02 mol/mol. In another embodiment the Li/M ratio is zero.

In the claims, d50 is defined as 50% of the volume of the powder consisting of particles with a size less or equal to the d50 value, where d50 is measured by a suitable known method such as laser diffraction in a dry or wet medium.

For the sake of simplicity, in the description, the Mn and Ni bearing $LiCoO_2$ particles will mostly be referred to as 'phase 1' or also as the 'modified $LiCoO_2$ phase', and the island-free phase having a generalized formula of $Li_{1+a}M'_{1-a}O_{2\pm b}$ will be referred to as the '$LiM'O_2$' (M'=Ni—Mn—Co) phase or 'phase 2' of the lithium transition metal oxide, which is also referred to as the 'cathode material'.

The actual invention discloses that, surprisingly, the rate performance of mixtures of $LiCoO_2$ (phase 1) and $LiM'O_2$ (M'=Ni—Mn—Co) with Ni:Mn ratio of >1 (phase 2) is dramatically improved if these mixtures have been heat treated with each other (co-sintering) in a way which causes an exchange of cations between $LiCoO_2$ and $LiM'O_2$ during sintering, causing a distribution of composition of the particles of phase 1 and of phase 2. At the same time a special morphology of the phase 1 particles ($LiCoO_2$) is obtained. The particles are partially covered by manganese containing $LiM'O_2$ sheets. The authors refer to this morphology as "island" morphology. At the same time, surprisingly, the stability at high voltage is dramatically improved as well.

The modified LiCoO's morphology, has islands densely sintered to the bulk of the modified $LiCoO_2$, causing local gradients of transition metal stoichiometry. The islands contain manganese in high concentration. Both the $LiCoO_2$, as well as the $LiM'O_2$ particles have a distribution of composition. Additionally, the $LiM'O_2$ particles have a morphology depending on the cobalt content. The size of primary crystallites increases with cobalt content. Contrary to EP1556915 A1 mentioned above, in the invention there is no radial change of stoichiometry. It is rather a multi-center gradient with the $LiM'O_2$ islands, located on the surface and acting as centers of the gradient. Also, the only partial coverage of the $LiCoO_2$ by islands is a very important difference.

Another important aspect of the invention is that the islands not completely cover the $LiCoO_2$ particles. A complete coverage—with other words—a $LiCoO_2$ core—$LiM'O_2$ shell morphology can be achieved by precipitating mixed hydroxide onto the surface of the $LiCoO_2$. This approach has been described in above mentioned patent applications EP1556915 A1 and EP1716609 A1 (Paulsen et al.). The case of the MOOH shell—$LiCoO_2$ core precursor has two major draw-backs, as described in Core-Shell Cathode Material with Size-Dependent Composition, Jens M. Paulsen, Jong-Seok Jeong, and Ki-Young Lee, Electrochem. Solid-State Lett., Volume 10, Issue 4, pp. A101-A105 (2007). (1) the process is more expensive and (2) during sintering more cobalt diffuses from the core into the shell. Thus the shell expands and the core shrinks at the same time. This typically causes a partial separation of the shell from the core, causing large cavities. These large cavities are very undesirable because (i) they increase the porosity of the electrode—thus causing a lower energy density and (ii) they hinder the direct diffusion of lithium across the cavity into or out of the core region of the $LiCoO_2$ particle—thus causing loss of rate performance.

The situation is different for the cathode materials of the actual invention. The manganese containing islands cover only a fraction of the surface of the $LiCoO_2$ particle. Therefore the cobalt diffusion induced swelling of the islands and shrinking of the $LiCoO_2$ core does not cause the creation of large cavities. As a result a high volumetric density and a high rate performance can be achieved.

The invention also covers an electrochemical cell comprising a cathode comprising as active material the powderous lithium transition metal oxide described before.

Details of the invention are now further discussed below.

The cathode material of the actual invention is a powder, containing modified $LiCoO_2$ and mostly, but not exclusively, a second transition metal phase. Both phases are lithium-transition-metal oxide phases with a layered crystal structure: ordered rocksalt type crystal structure—space group r-3m. The cathodes can be stoichiometry $Li_1M_1O_2$, with M being cobalt, manganese and/or nickel, or slightly lithium deficient ($Li_{1-x}M_{1+x}O_2$) or lithium rich $Li_{1+x}M_{1-x}O_2$, with x<0.3. The existence of oxygen non-stoichiometry is generally doubted. So the oxygen stoichiometry is aprox. 2.0, but it cannot be excluded that the cathodes are slightly oxygen deficient or rich in oxygen. Thus the total composition is $Li_xM_yO_{2\pm\delta}$ with 0.97<x<1.03, 0.97<y<1.03, x+y=2 and δ<0.05. M consists of manganese, cobalt and nickel, $M=Co_{1-f-g}Ni_fMn_g$ with the conditions that 0.05<f+g<0.5 and f≥g.

The first phase originates from the $LiCoO_2$ precursor and is a modified $LiCoO_2$. The composition can be defined as $LiCo_{1-a-b}Ni_aMn_bO_2$ with a≥b, 0.03<a+b<0.5 and preferably 0.1<a+b<0.5. The formula is idealized and does not take account of small possible deviations like lithium excess or deficiency, oxygen non-stoichiometry or doping as described above. Preferable the $LiCoO_2$ based particles are monolithic. A monolithic particle does not exhibit inner porosity, and it does not consist of agglomerates of smaller primary particles. One aspect of the invention is that different particles of the $LiCoO_2$ phase have not exactly the same composition. The actual composition of a particle depends on how much nickel and manganese has diffused into the $LiCoO_2$ particle during sintering. The Ni and Mn originate from the precursor of the second phase which typically is a mixed hydroxide. The amount of Mn and Ni which diffuses into the $LiCoO_2$ based phase during sintering, besides many other factors like temperature, Li:M ratio, etc., strongly depends on the arrangement of neighboring Ni—Mn based particles and the contact area and contact pressure. As a result, different $LiCoO_2$ particles have a different composition.

A second, very important aspect of the invention is that the metal composition of single $LiCoO_2$ based particles is not homogeneous. Typical particles have an island like surface morphology, the islands originating from smaller Ni—Mn based particles or crystallites, densely sintered to the surface of the $LiCoO_2$ particle. The islands have a higher concentration of manganese than the areas further apart from the island, or the regions in the inside of the particle. The existence of the island morphology is an inherent feature of the cathode material of the actual invention. These islands—being centers with higher manganese content—cannot be separated from the particle. They are densely and continuously connected with the bulk of the $LiCoO_2$ particle. Hence the manganese stoichiometry—with increasing distance from the island—decreases, possibly in a gradient-like manner and approaches zero in the inside of the particles or on the surface in-between distant islands. The inventors observed that the island morphology is related to the high observed rate performance of the disclosed cathode materials. The authors speculate that the islands—if they were not connected to the $LiCoO_2$ particles—would have different crystal lattice constants. However, the island is densely connected to the $LiCoO_2$, and between $LiCoO_2$ particle and island a region of manganese stoichiometry gradient exists. Therefore the island as well as the particles will undergo strong lattice strain. The strain somehow—the exact mechanism is unknown to the authors—enables a significantly faster diffusion of lithium into the particle.

A second phase is $LiM'O_2$ with $M'=Ni_mMn_nCo_{1-m-n}$, $m \geq n$, $0.1 < m+n \leq 0.9$ The formula is idealized and does not take account of small possible deviations as lithium excess or deficiency, oxygen non-stoichiometry or doping as described above. The second phase preferably originates from a Ni—Mn—Co containing precursor like mixed hydroxide, mixed oxihydroxide, mixed oxide, mixed lithium metal oxide or mixed carbonate. During the sintering the metal composition of the second phase changes. Cobalt diffuses from the $LiCoO_2$ particles into the $LiM'O_2$ particles. Some Ni and Mn diffuses out of the $LiM'O_2$ particles into the $LiCoO_2$ particles. As a result, the cobalt stoichiometry of the second phase is higher than the cobalt stoichiometry of the Ni—Mn—Co containing precursor. The change of cobalt stoichiometry is an important aspect of the invention. Only if the cobalt stoichiometry increases significantly during sintering, enough exchange of cations has taken place and only in this case the rate performance of the resulting cathode is sufficiently improved.

The inventors have made two more surprising observations, which are believed to be further essential aspects of the invention:

First observation: The fraction of second phase increases during sintering. Apparently, more cobalt diffuses into the second phase ($LiM'O_2$) than nickel and manganese diffuses into the $LiCoO_2$ phase. The inventors speculate that this difference in diffusion enhances the observed island morphology. Related to this observation is a clear change of voltage profile. A mixture of $LiCoO_2$ and $LiM'O_2$ has a characteristic voltage profile with a plateau at 3.88 V. With increased cation exchange the authors observed a disappearing of the 3.88 V plateau together with a lowering of the end-of discharge voltage. Furthermore, cobalt does not only diffuse into the $LiM'O_2$ particles but also into the manganese containing regions on the surface; during this process the areas between the island act as Co source. At the same time the island itself is a cobalt sink. In a simple picture—the manganese containing island swells with cobalt like a sponge would swell by removing water from its surrounding. This process explains why the islands morphology is created.

Second observation: The first phase has a composition which clearly differs from pure $LiCoO_2$. A large fraction of particles of the first phase contains at least 3 percent, more preferably 10% of manganese and nickel. Such a change of stoichiometry is usually accompanied by a significant change of lattice constants. However, X-ray diffraction analysis surprisingly shows that the lattice constants of the first phase (obtained from a two-phase Rietveld refinement) basically have not changed—they remain identically to those of $LiCoO_2$. The inventors believe that this is a very important aspect of the invention which shows that the improvement of rate performance of the first phase is not caused by the creation of a solid state solution between $LiCoO_2$ and $LiM'O_2$. (A solid state solution shows a gradual change of lattice constants depending on the composition.)

A further aspect of the invention is that the $LiM'O_2$ particles (second phase) have crystallites, the size of the crystallites correlates with the cobalt content. Apparently, during sintering, as more Ni (and Mn) diffused away from the $LiM'O_2$ into the $LiCoO_2$ particles, and as more Co diffuses into the $LiM'O_2$ particles, an acceleration of crystallite growth is caused. As a result, $LiM'O_2$ particles (second phase) with higher cobalt stoichiometry have larger primary crystallites. This is a very useful process because in a self-organized manner, an optimized morphology is achieved. This is because an increased content of cobalt causes a faster lithium diffusion, which allows for larger crystallites without losing rate performance. The correlation between high cobalt content and larger size however only refers to the size of crystallites, not to the size of particles. It is likely that large particles in average have a lower cobalt stoichiometry than small particles, because more cobalt has to diffuse a longer pathway.

The inventors understand the reactions which cause the island morphology as follows: during sintering, a significant fraction of the smaller and agglomerated $LiM'O_2$ particles are in contact with the $LiCoO_2$ particles. The contact points are the cobalt sinks, and manganese containing islands, inherently embedded on the surface of the $LiCoO_2$ particle are formed. At the same time, nickel (and some manganese) diffuses into the $LiCoO_2$ and cobalt diffuses into the $LiM'O_2$ particle. During sintering the density of the agglomerated $LiM'O_2$ particles, caused by the up-take of cobalt and due to thermal sintering increases. During the densification the contact between the swelling island and the $LiM'O_2$ particle is lost and the final cathode, consisting of particles of two different phases is achieved.

The loss of contact between $LiM'O_2$ and $LiCoO_2$ is easier if the $LiM'O_2$ particle is agglomerated. In this case only a part of the $LiM'O_2$ particle is consumed and forms the seed for the island. Alternatively, no loss of contact is required if the Ni—Mn—Co precursor has very small particles with a d50 of less than 1-2 micrometer. In this case, a large fraction or even the totality of the Ni—Mn—Co particles is consumed to form the seed of the island. As a consequence, different implementations of the actual invention are possible.

First typical implementation: it is particularly preferred that the Ni—Mn—Co precursor consists of agglomerated crystallites. A preferred example is a mixed hydroxide, where secondary particles consist of not too dense agglomerates of primary particles. Very dense and large Ni—Mn—Co precursors are less suitable. A preferred particle size distribution has a d50 of 4-8 micrometer. In this case $LiM'O_2$ particles are small enough to (a) support a very high rate and (b) they fit nicely in-between the voids of the larger $LiCoO_2$ particles which allows for low porosity electrodes and a high volumetric energy density.

Preferably, the precursor for the first phase ($LiCoO_2$) is monolithic, dense and has much larger size than the precursor for the second phase ($LiM'O_2$) which is agglomerated, less dense and has smaller size. A preferred precursor for the first phase is $LiCoO_2$ with dense monolithic particles of at least 10-20 micrometer. Many commercial $LiCoO_2$ materials have this desired morphology. Alternatively, cobalt hydroxide, cobalt oxyhydroxide, cobalt oxide or cobalt carbonate is a suitable precursor if it has large particles (at least 10-20 micrometer) and high density. As an example—cobalt hydroxide or oxyhydroxide with roughly spherical particles and a tap density above $2.0 g/cm^3$ and a d50 of the particle size distribution larger than 15-20 micrometer is a suitable precursor.

The cobalt precursor, preferably, consists of large particles (d50>10-20 micrometer) which are dense and monolithic. Suitable cobalt precursors are commercial $LiCoO_2$, or high density (tap density >2 $g/cm^3$) cobalt hydroxide, oxyhydroxide or carbonate. Suitable shapes of the precursors are spherical or irregularly potato shaped particles, for example.

The reaction—formation of a manganese containing island, accompanied by cation exchange between cobalt and nickel—is the same in both implementations. The inventors believe that an essential aspect which causes the formation of the island morphology is the lower mobility of (4 valent) manganese compared to that of 3 valent nickel in $LiCoO_2$ and 3 valent cobalt in $LiM'O_2$. Also, the (4 valent) manganese does not take part in the electrochemical insertion/extraction of lithium during charge/discharge of the batteries some of the manganese can be replaced by other cations. A suitable cation is also titanium. Similar as manganese it is electrochemically inert, has low mobility and it can be doped into a Ni—Mn—Co precursor. For example, similar as manganese, titanium can be doped into $LiNiO_2$.

Another important aspect of the invention is that a high rate performance is achieved even if the cathode material is slightly Lithium sub-stoichiometric. We observed that the highest rate performance is achieved if the total lithium content per transition metal was approx. 0.98, i.e. less than unity. This is very surprising, because in the case of lithium transition metal oxides $Li_{1+z}M_{1-z}O_2$ where M contains nickel it is widely accepted that a lithium deficiency causes cation mixing (that are nickel atoms misplaced on crystallographic lithium sites), and the increased cation mixing causes a poor rate performance.

The present invention discloses a strategy to obtain high voltage stable and high rate capable $LiCoO_2$ based cathodes. The obtained $LiCoO_2$ based cathode materials have a high density and can be cycled in a stable manner in real cells at high voltage. A key point of the strategy is to achieve very low electrical conductivity, orders in magnitude lower than reported for other current cathode materials.

It is widely accepted that a sufficient electrical conductivity is required when targeting high performance cathode performance. A typical example is the use of carbon coated fine particle $LiFePO_4$. Without carbon coating the capacity and rate performance is very poor. In the case of $LiFePO_4$ a typical target for conductivity of pressed cathode powder is $10^{-3}$ to $10^{-2}$ S/cm. Other cathode materials have relatively high electrical conductivity as well.

The electrical conductivity of different reference materials was measured using pressed pellets at a pressure of 63.7 MPa at room temperature. With a typical electrolyte ionic conductivity of 10 mS/cm ($10^{-2}$ S/cm) we can define cathodes having similar or higher electrical conductivity as being "high conductive"; if the conductivity is greater than to about 1% of that value ($10^{-4}$ S/cm) we define it as "low conductive". If the conductivity is less than 0.1% ($10^{-5}$ S/cm) the cathode can be defined as "insulating". It is generally accepted that cathodes must at least have low conductivity, and insulating cathodes cannot work well.

High Ni materials like $LiNi_{0.8}Co_{0.15}Al_{0.05}O_2$ for example have about $3.47*10^{-2}$ S/cm, LMNCO($LiNi_{0.5}Mn_{0.3}Co_{0.2}O_2$) has about $2.21*10^{-3}$ S/cm, the famous "111" ($Li_{1+x}M_{1-x}O_2$ with $M=Ni_{1/3}Co_{1/3}Mn_{1/3}$ and has about $2.03*10^{-4}$ S/cm. Commercial $LiCoO_2$ has a relatively low electrical conductivity in the range of $10^{-2}$ to $10^{-3}$ S/cm. For all of these cathode materials conductivities above $10^{-5}$ S/cm are measured. Thus none of these cathodes is insulating.

The cathode materials of the present invention are "insulating" using the above described definition. They have conductivities which are at least 2-3 orders lower than those of the least conductive currently known cathode material. It is believed that the low conductivity is the main reason for the high voltage stability of the new insulating cathode materials. That such insulating cathodes can yield excellent electrochemical performance, namely large discharge capacity and rate performance, is a surprise because it is commonly accepted that a certain electrical conductivity is needed for the Li cation diffusion within the solid cathode and across the interface between electrolyte and cathode.

When a $LiCoO_2$ based cathode is charged to high voltage—meaning the cathode is strongly de-intercalated—we achieve a $Li_xCoO_2$ composition where most of the Co is in the 4 valent state. Tetravalent $Li_xCoO_2$ is a very strong oxidizer and highly reactive. The electrolyte is thermodynamically not stable in contact with such an oxidizing surface. A reaction with the electrolyte (being the reducing agent) is strongly preferred energetically. Even at low temperature—during normal cycling of a $LiCoO_2$ cathode at high voltage—this reaction proceeds slowly but continuously. Reaction product covers the cathode surface and electrolyte is decomposed, and both effects continuously cause a deterioration of electrochemical performance of the battery; a loss of capacity and a strong increase of resistance—by polarization—is observed.

The situation for high voltage charged cathodes is not so different to those of the well investigated carbon anode. The electrolyte is not stable at the reducing conditions during Li intercalation where the potential is near zero V (versus Li/Li+). Thus the electrolyte decomposes and becomes reduced. In this case, however, the decomposition products of electrolyte with lithium form the so-called SEI (solid electrolyte interface). It is generally accepted that the SEI is an ionic conductor but electronic insulator. Thus the SEI still allows for Li transport across the surface between solid and electrolyte but it prevents further reduction of the electrolyte. The key point is that the reduction of electrolyte locally requires the simultaneous presence of a Li cation as well as an electron. The Li cation is present in the electrolyte and the electron in the carbon bulk. If, however, the SEI, as electronic insulator physically separates the electrons in the carbon from the Li cations in the electrolyte then further electrolyte reduction is not possible.

This mechanism is well known and it has been tried to apply a similar mechanism to the cathode. Much research focused on electrolyte additions which would decompose on the cathode surface to form a cathode SEI. However, the search for electrode additives which form a SEI at high voltage when in contact with a highly oxidized (i.e. delithiated) cathode has been not or only partially successful.

Obviously, an electronically insulating cathode material will solve this problem. If an electronically insulating cathode material could be successfully cycled then we would expect a high voltage stability because the oxidation of the electrolyte requires that an electron is supplied to the cathode. It is however generally assumed up to now that such an insulating cathode could not have good electrochemical performance.

The current invention is based on the discovery that insulating cathodes can have high voltage stability and it is possible to achieve insulating cathodes which nevertheless show very good electrochemical performances.

Hence, an example pressed powder of the cathode, such as disclosed below, shows very low conductivity, practically being a good insulator. But, surprisingly, the cathode shows excellent electrochemically performance. Furthermore, measurements show that the bulk of the cathode particles is conductive whereas the surface is insulating.

In one embodiment, in order to achieve good performance, the lithium metal oxide powder particles may have the following characteristics:
- a core-shell structure where the shell is electronically insulating and the core is electronically conducting,
- an insulating shell that does not cover the core completely, typically much more than 50% but less than 100%, and
- a shell that dominantly consists of transition metal.

A further important aspect of the invention is that the inner core of the particles has higher conductivity than the outside region. In a typical implementation of the invention the outside is richer in manganese than the inside region. We observe a high electrochemical performance despite that the outside of the $LiCoO_2$ particles is covered by a non-conductive shell.

An example of morphology of cathodes of the present invention is as follows: a relatively conductive core is mostly, but not to 100%, covered by an insulating shell. Furthermore, the insulating shell dominantly can consist of transition metal oxides where the metal composition comprises at least 95% cobalt, manganese and nickel.

The presence of a core shell structure is however only one of the embodiments of the invention, which is especially observed in powders that have large average particle sizes, such as at least 10 μm, or even at least 20 μm. The claimed process allows obtaining the lowest possible electrical conductivity independently of the obtained structure. By varying the Li:metal blend ratio, cathodes with different electrical conductivity are achieved. The Li:metal ratio according to one embodiment is the ratio which results in minimum electrical conductivity. High voltage stable cathodes are those cathode materials which have the minimum conductivity as function of Li:metal ratio.

The invention may be practiced, for example, by way of the different examples described below.

EXAMPLE 1

This example demonstrates that cycle stability improves as electrical conductivity decreases. The improved stability and decrease of conductivity is achieved by optimizing the Li:metal ratio.

Preparation of LCO-1: 0.25 mol % titanium and 0.5 mol % magnesium doped $Co(OH)_2$ is prepared in a pilot line, as precursor for $LiCoO_2$. Titanium and magnesium doped $LiCoO_2$ (noted LCO-1) is obtained by means of a standard high temperature solid state synthesis by mixing the precursor with $Li_2CO_3$ to achieve an average particle size of 25 μm.

Preparation of island-coated LCO-1: A cathode powder material is prepared by mixing 95 wt. % of titanium and magnesium doped $LiCoO_2$ (LCO-1), with 5 wt. % of MOOH mixed transition metal oxy-hydroxide with $M=Ni_{0.55}Mn_{0.30}Co_{0.15}$ and either none or pre-determined amounts of $Li_2CO_3$. Examples 1a, 1b and 1c are prepared according to Table 1 and sufficiently mixed to prepare a homogeneous raw material mixture. The mixture is placed in an alumina crucible and heated at 1000° C. for 8 h under constant air flow. After cooling, the resulting powder is sieved and characterized by means of 4-probe DC-conductivity and further fitted in a coin cell for electrochemical characterization.

TABLE 1

Composition of blend for Examples 1a, 1b and 1c obtained from LCO-1. The Li/M molar ratio relates the Li addition through $Li_2CO_3$ to the transition metal content in $LiCoO_2$ (LCO-1) and MOOH together (with M = Ni, Mn and Co).

|  | $LiCoO_2$ (g) | MOOH (g) | $Li_2CO_3$ (g) | Li (in $Li_2CO_3$) to transition metal molar ratio |
| --- | --- | --- | --- | --- |
| Example 1a | 150.00 | 7.59 | 0 | 0 |
| Example 1b | 150.00 | 7.59 | 0.57 | 0.0094 |
| Example 1c | 150.00 | 7.59 | 1.13 | 0.0187 |

Table 2 summarizes the electrical conductivity under an applied pressure of 63 MPa and electrochemical performances of Examples 1a, 1b and 1c and of LCO-1. SEM images of LCO-1 and Example 1a are displayed on FIG. 1. The morphology of the two products is very different: LCO-1 has non agglomerated particles with smooth surface whereas Example 1a has a particular island coating at the surface of $LiCoO_2$ particles.

TABLE 2

Electrical conductivity and electrochemical performances at 4.5 V of Examples 1a, 1b and 1c and of LCO-1.

|  | Discharge capacity 0.1 C at 4.5 V mAh/(g) | Discharge capacity 1 C at 4.5 V (mAh/g) | Rate performance 3 C (%) | Capacity fading 1 C (%) | Energy fading 1 C (%) | Electrical conductivity (S · cm$^{-1}$) |
| --- | --- | --- | --- | --- | --- | --- |
| LCO-1 | 179.9 | 164.8 | 79.0 | 31.3 | 40.1 | 6.49 * 10$^{-3}$ |
| Example 1a | 183.8 | 181.1 | 92.6 | 2.1 | 3.2 | 1.02 * 10$^{-7}$ |
| Example 1b | 186.4 | 183.1 | 95.1 | 13.0 | 18.1 | 5.83 * 10$^{-7}$ |
| Example 1c | 186.3 | 181.5 | 93.0 | 16.1 | 24.2 | 5.21 * 10$^{-6}$ |

Figure 2:
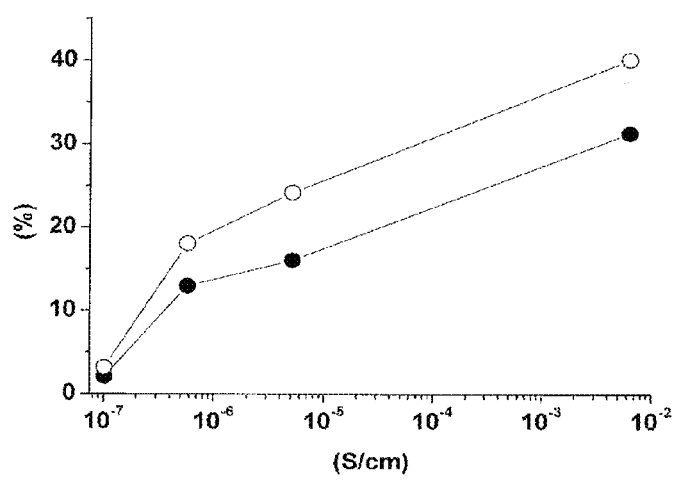
FIG. 2 is a graph illustrating the relationship between electrical conductivity and cycling stability at 4.5V.

The relationship between electrical conductivity and cycling stability at 4.5V is illustrated on FIG. 2. The electrical conductivity of the coated samples (i.e. Examples 1a to 1c) is 3 to 4 orders of magnitude lower than for uncoated LCO-1. Electrochemical properties such as discharge capacity, rate performance, capacity fading and energy fading of LCO-1 are very poor. Examples 1a to 1c feature dramatic improvements of these properties compared to LCO-1. For Examples 1a to 1c, the electrical conductivity increases upon lithium addition. At the same time, both capacity fading and energy fading are impaired. The decrease of resistivity correlates well with 4.5V stability improvements for both coated and uncoated samples. Examples 1a, b & c are insulating and are examples of an embodiment of the invention.

In this and all of the following examples, the electrochemical performance is tested in coin type cells, with a Li foil as counter electrode in a lithium hexafluorite (LiPF$_6$) type electrolyte at 25° C. The active material loading weight is in the range of 10 to 12 mg/cm$^2$. Cells are charged to 4.3 V and discharged to 3.0 V to measure rate performance and capacity. The high voltage discharge capacity and capacity retentions during extended cycling are measured at 4.5V or 4.6V (in Examples 3-4 & 9) charge voltage.

A specific capacity of 160 mAh/g is chosen for the determination of the discharge rates. For example, for the discharge at 2 C, a specific current of 320 mA/g is used.

This is an overview of the test that is used for all of the coin or full cells in this description:

| Cycle | Charge | Discharge | Purpose of test |
|---|---|---|---|
| 1 | 4.3 V, 0.1 C | 3.0 V, 0.1 C | Voltage profile |
| 2-6 | 4.3 V, 0.25 C | 3.0 V, 0.2, 0.5, 1, 2, 3 C | Rate performance |
| 7, 31 | 4.5 V (or 4.6 V), 0.25 C | 3.0 V, 0.1 C | Slow reference cycle before and after stability, cycle 7 gives the discharge capacity 0.1 C at 4.5 V (or 4.6 V) |
| 8, 32 | 4.5 V (or 4.6 V), 0.25 C | 3.0 V, 1 C | Fast reference cycle before and after stability, cycle 8 gives the discharge capacity 1 C at 4.5 V (or 4.6 V) |
| 9-30 | 4.5 V, 0.25 C | 3.0 V, 0.5 C | Stability test |

The following definitions are used for data analysis: (Q: capacity, D: Discharge, C: Charge).

The discharge capacity QD1 is measured during the first cycle in the 4.3-3.0 V range at 0.1C.

Irreversible capacity Qirr is (QC1−QD1)/QC1 (in %).

Rate performance: QD at resp. 0.2, 0.5, 1, 2, 3 C versus QD at 0.1C.

Fade rate (0.1C) per 100 cycles, for capacity: (1−QD31/QD7)*100/23.

Fade rate (1.0C) per 100 cycles, for capacity: (1−QD32/QD8)*100/23.

Energy fade: instead of discharge capacity QD the discharge energy (capacity×average discharge voltage) is used.

EXAMPLE 2

This example will demonstrate that the cycling stability of island coated LiCoO$_2$ is much higher than that of uncoated LiCoO$_2$, where at the same time its electrical conductivity is about five orders of magnitude lower. The example also provides clear evidence that the cycling stability of the island coated LiCoO$_2$ increases with the decrease of the intrinsic electrical conductivity.

Preparation of LCO-2: 1 mol % magnesium doped Co(OH)$_2$ as precursor for LiCoO$_2$ is prepared in a pilot line. Magnesium doped LiCoO$_2$ (noted LCO-2) is obtained by means of a standard high temperature solid state synthesis by mixing the precursor with Li$_2$CO$_3$ to achieve an average particle size of 25 μm.

Preparation of LCO-3: 1 mol % magnesium doped cobalt tetroxide (Co$_3$O$_4$) powder as precursor for LiCoO$_2$ is used (commercially available product from Umicore, Korea). Magnesium doped LiCoO$_2$ (noted LCO-3) is obtained by means of a standard high temperature solid state synthesis by mixing the precursor with Li$_2$CO$_3$ to achieve an average particle size of 25 μm.

Preparation of island-coated LCO-2 and LCO-3: A cathode powder material is prepared by mixing 95 wt. % of LCO-2 or LCO-3, with 5 wt. % of MOOH mixed transition metal oxyhydroxide with M=Ni$_{0.55}$Mn$_{0.30}$Co$_{0.15}$ and pre-determined amounts of Li$_2$CO$_3$. Examples 2a, 2b and 2c obtained from LCO-2 and Examples 2d, 2e and 2f obtained from LCO-3 are prepared according to the precursor contents listed in Table 1 and sufficiently mixed to prepare a homogeneous raw material mixture.

TABLE 3

Composition of blend for Examples 2a, 2b and 2c obtained from LCO-2 and Examples 2d, 2e and 2f obtained from LCO-3. The Li/M molar ratio relates the Li addition through Li$_2$CO$_3$ (either LCO-2 or LCO-3) to the transition metal content in LiCoO$_2$ and MOOH together (with M = Ni, Mn and Co).

| | LiCoO$_2$ (g) | | MOOH (g) | Li$_2$CO$_3$ (g) | Li/transition metal molar ratio |
|---|---|---|---|---|---|
| Example 2a | 150.00 | LCO-2 | 7.59 | 0 | 0 |
| Example 2b | 150.00 | | 7.59 | 0.57 | 0.0094 |
| Example 2c | 150.00 | | 7.59 | 1.13 | 0.0187 |
| Example 2d | 150.00 | LCO-3 | 7.59 | 0 | 0 |
| Example 2e | 150.00 | | 7.59 | 0.57 | 0.0094 |
| Example 2f | 150.00 | | 7.59 | 1.13 | 0.0187 |

Figure 3:
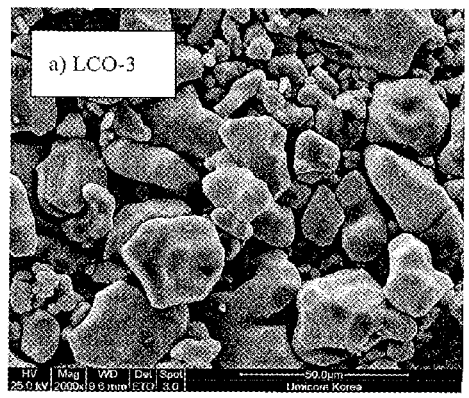
FIG. 3a is an SEM image showing the powder of LCO-3.
FIG. 3b is an SEM image showing the powder of Example 2d.
Figure 3:
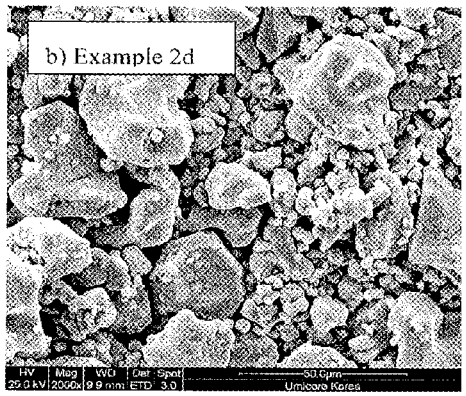
Figure 3:
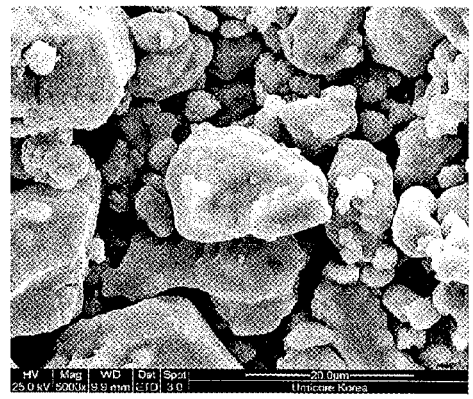

The mixtures are placed in an alumina crucible and heated at 1000° C. for 8 h under constant air flow. After cooling, the resulting powders are sieved and characterized by means of 4-probe DC-conductivity and further fitted in a coin cell for electrochemical characterization. Table 4 summarizes the electrical conductivity under an applied pressure of 63 MPa, and the electrochemical performances of Examples 2a to 2f and of LCO-2 and LCO-3 (test protocol as in Ex. 1). SEM images of LCO-3 and Example 2d are displayed on FIG. 3 (Note that similar results are obtained for the LCO-2 series). The morphology of the two products is very different: LCO-3 has non agglomerated particles with smooth surface whereas Example 2d exhibits a particular island coating at the surface of the LiCoO$_2$ particles.

TABLE 4

Electrical conductivity and electrochemical performances of Examples 2a-f, and of the reference LiCoO$_2$ based compositions.

| | Discharge capacity 0.1 C (mAh/g) | Discharge capacity 1 C (mAh/g) | Rate performance 3 C (%) | Capacity fading 1 C (%) | Energy fading 1 C (%) | Electrical conductivity (S · cm$^{-1}$) |
|---|---|---|---|---|---|---|
| LCO-2 | 181.1 | 166.2 | 81.39 | 30.9 | 55.3 | 9.27 * 10$^{-3}$ |
| Example 2a | 186.3 | 184.9 | 97.14 | 4.4 | 7.0 | 3.78 * 10$^{-8}$ |
| Example 2b | 187.4 | 185.7 | 97.10 | 4.6 | 5.5 | 9.64 * 10$^{-8}$ |
| Example 2c | 186.9 | 183.2 | 94.80 | 11.4 | 17.5 | 3.15 * 10$^{-6}$ |
| LCO-3 | 175.0 | 153.7 | 75.19 | 77.36 | 104.2 | 4.37 * 10$^{-2}$ |
| Example 2d | 185.2 | 182.8 | 96.02 | 1.9 | 0.5 | 3.19 * 10$^{-8}$ |
| Example 2e | 187.0 | 183.2 | 95.19 | 3.3 | 3.2 | 1.59 * 10$^{-7}$ |
| Example 2f | 186.5 | 181.1 | 93.57 | 8.0 | 8.7 | 3.31 * 10$^{-6}$ |

Figure 4:
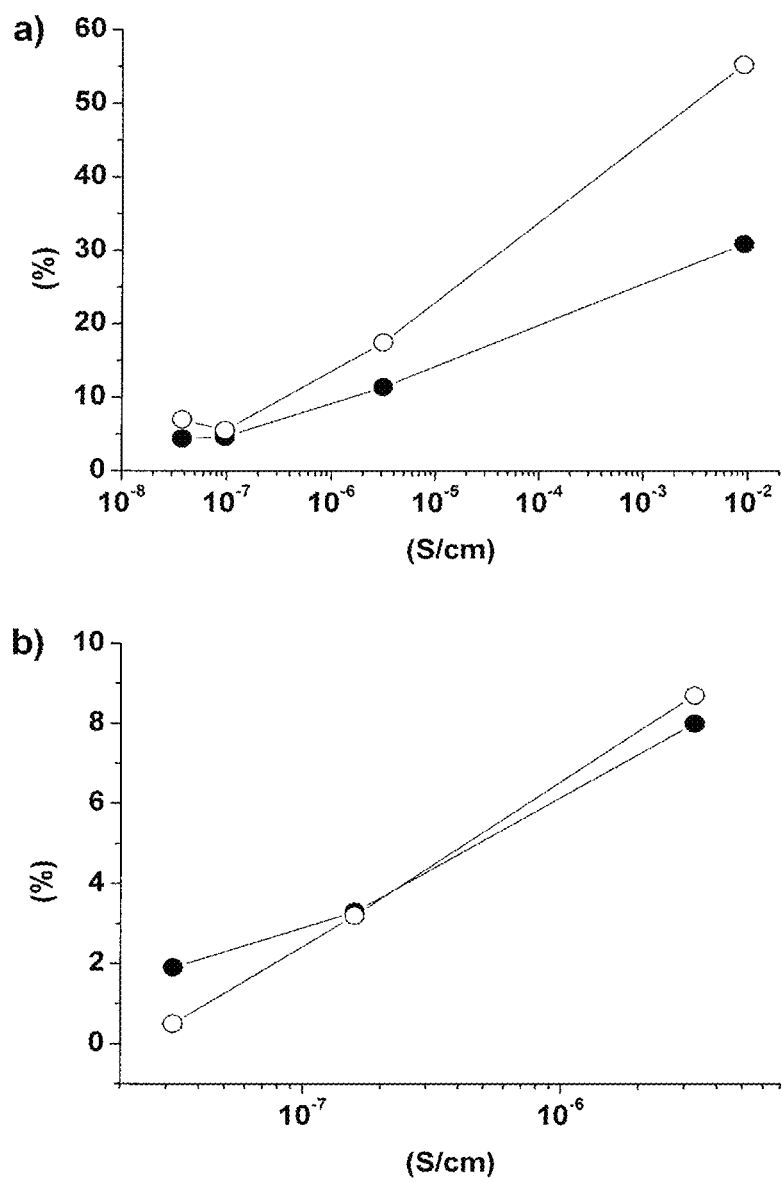
FIGS. 4a and b are graphs illustrating the relationship between electrical conductivity and cycling stability at 4.5V.

The relationship between electrical conductivity and cycling stability at 4.5V is illustrated on FIG. 4. The electrical conductivity of the island coated samples (i.e. Examples 2a to 2f) is 5 to 6 orders of magnitude lower than for uncoated LCO-2 and LCO-3. Electrochemical properties such as discharge capacity, rate performance, capacity fading and energy fading of LCO-2 and LCO-3 are very poor. Examples 2a to 2f feature dramatic improvements of these properties compared to LCO-2 and LCO-3. For Examples 2a to 2c and 2d to 2f, the electrical conductivity increases upon lithium addition. At the same time, both capacity fading and energy fading are impaired. The decrease of resistivity correlates well with 4.5V stability improvements for both coated and uncoated samples. Examples 2a-f are insulating and are examples of an embodiment of the invention.

EXAMPLE 3

This example demonstrates that island coated $LiCoO_2$ having an electronic insulating behavior has superior cycling stability in full cells.

Preparation of Example 3 (Ex3): Ex3 is prepared on a pilot production line by sintering a mixture of LCO-3 and MOOH (M=$Ni_{0.55}Mn_{0.30}Co_{0.15}$) in a 95:5 molar ratio and appropriate lithium carbonate addition to achieve a conductivity of less than $5*10^{-8}$ S/cm. The average particle size of Ex3 is 25 µm. In this case, the electrical conductivity under an applied pressure of 63 MPa is measured to be $3.94*10^{-8}$ S/cm. Coin cell performances at 4.5V and 4.6V of Ex3 are listed in Table 5a and show outstanding electrochemical performances.

TABLE 5a

Electrical conductivity and electrochemical performances at 4.5 V and 4.6 V of Example 3.

| | Discharge capacity 0.1 C (mAh/g) | Discharge capacity 1 C (mAh/g) | Rate performance 3 C (%) | Capacity fading 1 C (%) | Energy fading 1 C (%) | Electr. conductivity $(S \cdot cm^{-1})$ |
|---|---|---|---|---|---|---|
| Example 3 at 4.5 V | 187.3 | 183.4 | 94.91 | 1.47 | 0.87 | $3.94*10^{-8}$ |
| Example 3 at 4.6 V | 218.3 | 214.6 | | 20.2 | 19.4 | |

The pressed density is measured by applying 1.58 Ton/cm² on the as-obtained powder. The pressed density of Ex3 is 3.82 g/cm³.

Ex3 is tested in Li-ion polymer battery (LiPB) using a 10 µm polyethylene separator with a graphite-type anode as counter electrode in a lithium hexafluorite ($LiPF_6$) type electrolyte at 25° C. After formation, the LiPB cells are cycled 500 times between 4.35V (or 4.40V) and 3.0 V to measure capacity retentions during extended cycling. A specific capacity C of 800 mAh is assumed for the determination of the charge and discharge rates. Charge is performed in CC/CV mode at 1C rate using a cutoff current of 40 mA and the discharge was done at 1C in CC mode down to 3V.

Figure 5:
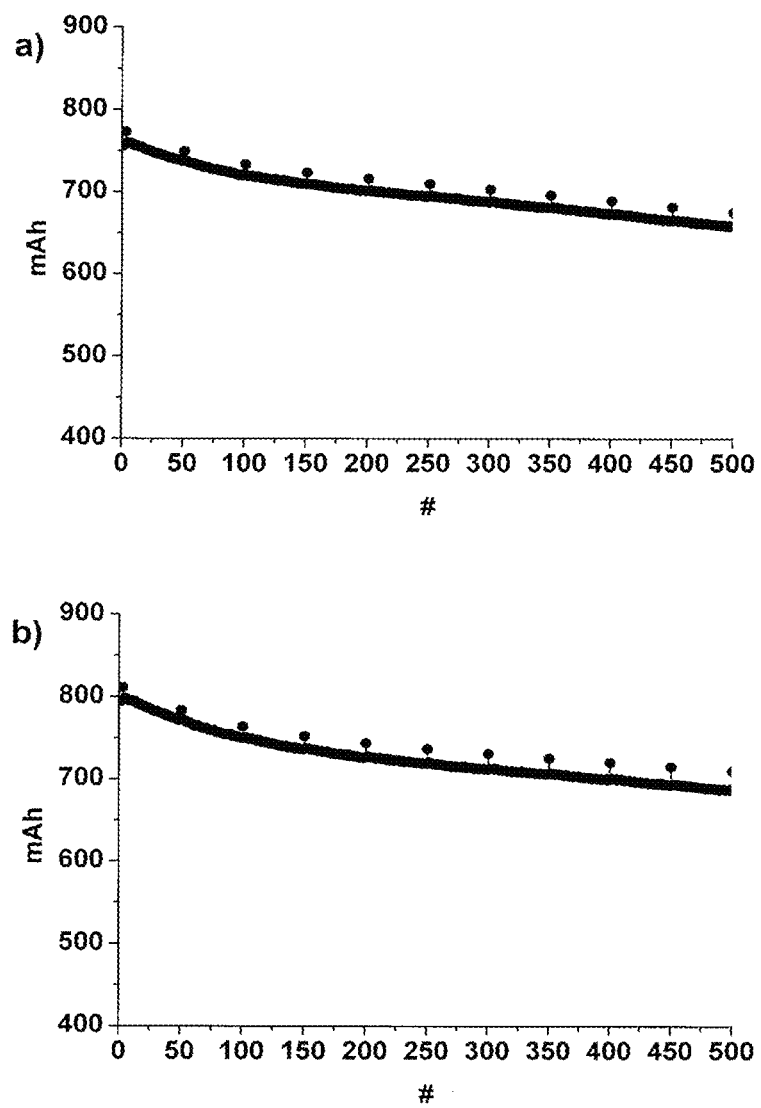
FIG. 5a is a graph showing the fading of the discharge capacity upon cycling of Ex3 at 4.35V.
FIG. 5b is a graph showing the fading of the discharge capacity upon cycling of Ex3 at 4.4V.
Figure 6:
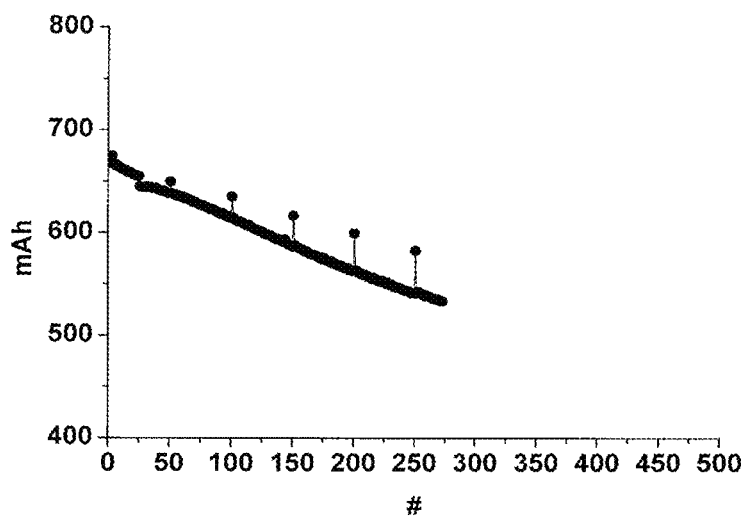
FIG. 6 is a graph comparing the life performance of Ex3 and a standard $LiCoO_2$.

The fading of the discharge capacity upon cycling of Ex3 at high voltage (4.35V) and very high voltage (4.4V) are shown on FIGS. 5a and 5b, respectively. Life performance of Ex3 is compared to a standard $LiCoO_2$ (a Umicore mass production commercial product with an average particle size of 17 µm) for which data are shown on FIG. 6. The electrical conductivity of this standard $LiCoO_2$ is $9.0*10^{-2}$ S/cm.

Full cell experiments confirm that Ex3, consistent with a lower electrical conductivity, has superior cycle stability compared to standard $LiCoO_2$. At the end of the 500 cycles, Ex3 features a reversibly capacity superior to 85% of the initial capacity both at 4.35V and 4.40V where a drop to 85% is quickly reached after 200 cycles for the standard $LiCoO_2$ at 4.35V.

EXAMPLE 4

$Al_2O_3$ Coated $LiCoO_2$

This example demonstrates once more that cycling stability improves as conductivity decreases. The improved stability can be achieved by coating. However, a sufficient low value of conductivity is not achieved, and as lower values are approached, the reversible capacity deteriorates.

The $LiCoO_2$ precursor (LCO-4) is a 1 mol % Mg doped $LiCoO_2$, (a Umicore mass production commercial product). It has potato shaped particles with a d50 of the particle size distribution of about 17 µm. 3 samples are prepared from a $LiCoO_2$ precursor by a mass production coating process, that is disclosed in co-pending application EP10008563. By the coating process fine $Al_2O_3$ powder is attached to the surface, followed by a mild heat treatment above 500° C. to react the $Al_2O_3$ powder with the surface of the $LiCoO_2$ (LCO-4).

The 3 samples (CounterEX4a, CounterEX4b, CounterEX4c) have different levels of Al coating. CounterEX4a contains 0.05 wt % Al, CounterEX4b 0.1 wt %, and CounterEX4c 0.2 wt %. The electrical conductivity results are listed in Table 5b. Aluminum-coated samples have a lower conductivity than uncoated LCO-4 and, for coated samples, the conductivity decreases continuously with the Al coating thickness.

TABLE 5b

Electrical conductivity of alumina coated $LiCoO_2$.

| Sample | Al wt % | Electrical conductivity $(S \cdot cm^{-1})$ |
|---|---|---|
| LCO-4 | 0% | $4.03*10^{-2}$ |
| CounterEx4a | 0.05% | $3.07*10^{-3}$ |
| CounterEx4b | 0.1% | $1.02*10^{-3}$ |
| CounterEX4c | 0.2% | $0.63*10^{-3}$ |

The electrochemical performance (capacity, rate, cycle stability at 4.5V) is tested in coin cells. The uncoated sample has very poor stability. Coated samples show good stability, Table 6 shows the results. The discharge capacity is from 4.5-3.0V, obtained from cycle 7 of the before given cycle schedule. A clear improvement of cycling stability is observed with increasing coating level, independently how the cycling stability is measured. However, at the same time the electrochemical performance (capacity, rate) deteriorates with increasing $Al_2O_3$ coating thickness.

TABLE 6

Coin cell testing results (4.5-3.0 V) for $Al_2O_3$ coated $LiCoO_2$.
CounterEX4a and 4c have been further investigated at 4.6 V.

| | Discharge capacity 0.1 C (mAh/g) | Discharge capacity 1 C (mAh/g) | Rate performance 3 C (%) | Capacity fading 1 C (%) | Energy fading 1 C (%) |
|---|---|---|---|---|---|
| CounterEx4a at 4.5 V | 181.2 | 166.0 | 84.91 | 20.89 | 39.59 |
| CounterEx4a at 4.6 V | 203.8 | 183 | | 83.8 | 90.7 |

TABLE 6-continued

Coin cell testing results (4.5-3.0 V) for $Al_2O_3$ coated $LiCoO_2$.
CounterEX4a and 4c have been further investigated at 4.6 V.

| | Discharge capacity 0.1 C (mAh/g) | Discharge capacity 1 C (mAh/g) | Rate performance 3 C (%) | Capacity fading 1 C (%) | Energy fading 1 C (%) |
|---|---|---|---|---|---|
| CounterEx4b at 4.5 V | 179.6 | 163.4 | 83.19 | 17.28 | 33.76 |
| CounterEX4c at 4.5 V | 177.0 | 159.9 | 81.00 | 14.93 | 30.10 |
| CounterEx4c at 4.6 V | 198.9 | 175.6 | | 102.6 | 107.6 |

Figure 7:
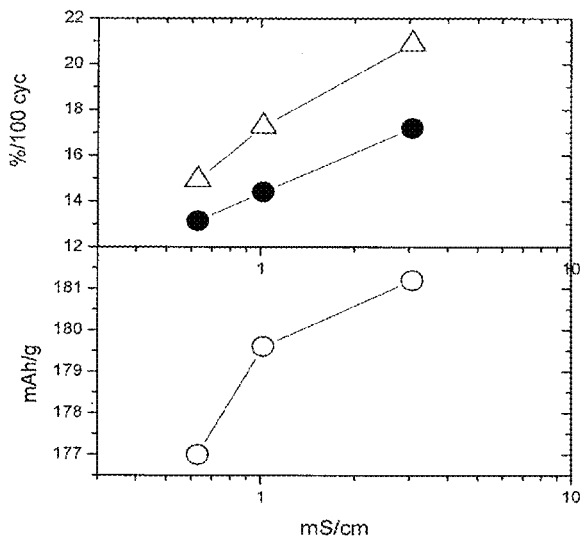
FIG. 7 is a graph summarizing the results of capacity and cycle stability at 4.5V as a function of conductivity.

FIG. 7 summarizes the results of capacity and cycle stability at 4.5 V as a function of conductivity: in the top figure both capacity (triangles) and energy (full black circles) fading is plotted against conductivity; in the bottom figure the discharge capacity is plotted against conductivity. It is clearly observed that for a decreasing conductivity, better high voltage stability at 4.5V is obtained. However, at the same time the reversible capacity deteriorates. Thus, in the case of alumina coated $LiCoO_2$ a further improving of cycle stability by decreasing the electrical conductivity is difficult without losing electrochemical performance. In addition, electrochemical properties at 4.6V are very low compared to Example 3, independently of the aluminum coating level.

EXAMPLE 5

This example demonstrates that island coated $LiCoO_2$ have an electronic insulating shell, providing superior cycling stability, and an electronic conductive core.

Example 5a sample is prepared on a pilot line by sintering a mass production 1 mol % magnesium-doped $LiCoO_2$ with a mean particle size of 23 μm (notation: LCO-5) and MOOH (M=$Ni_{0.55}Mn_{0.30}Co_{0.15}$) in a 95:5 molar ratio and appropriate lithium carbonate addition to achieve conductivity lower than $1*10^{-7}$ S/cm. The pressed density of Ex 5a is 3.87 g/cm$^3$.

Preparation of CounterExample 5b: 30 g of Example 5a and 400 g of 1 cm diameter zirconia balls are put in a 1 L jar and shaken by means of a Turbula mixer for 12 h. The as prepared powder is then collected for further experiments.

TABLE 7

Electrical conductivity and electrochemical
performances of LCO-5 and Ex. 5a and 5b.

| | Discharge capacity 0.1 C (mAh/g) | Discharge capacity 1 C (mAh/g) | Rate performance 3 C (%) | Capacity fading 1 C (%) | Energy fading 1 C (%) | Electrical conductivity (S·cm$^{-1}$) |
|---|---|---|---|---|---|---|
| LCO-5 | 176.28 | 158.5 | 81.02 | 72.03 | 99.33 | $4.80*10^{-2}$ |
| Ex 5a | 186.3 | 183.0 | 95.19 | 4.2 | 4.2 | $7.13*10^{-8}$ |
| CounterEx5b | 166.2 | 159.6 | 89.04 | 53.59 | 78.87 | $8.41*10^{-3}$ |

Figure 8:
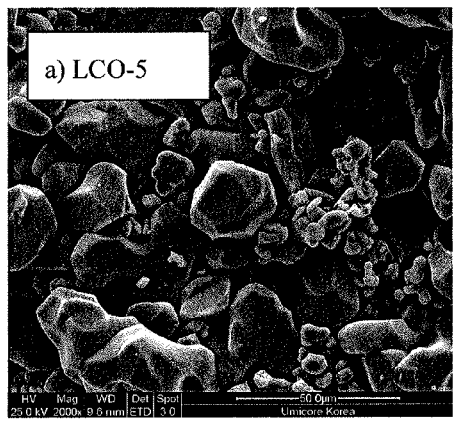
Figure 8:
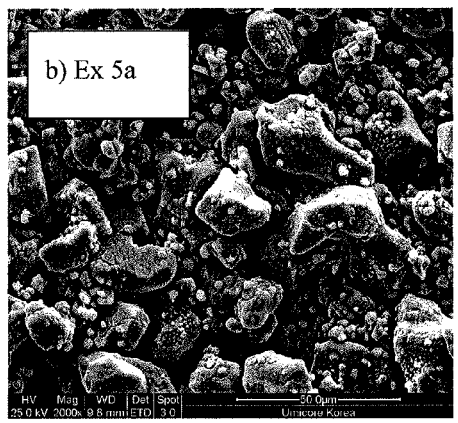
Figure 8:
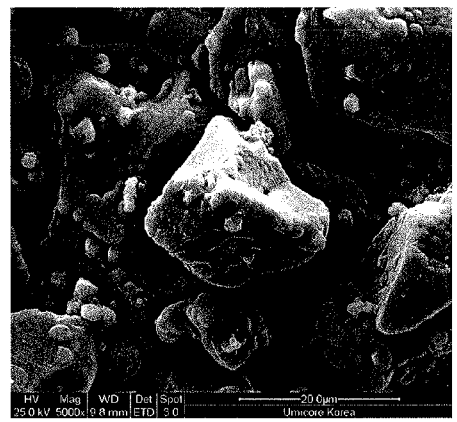
Figure 8:
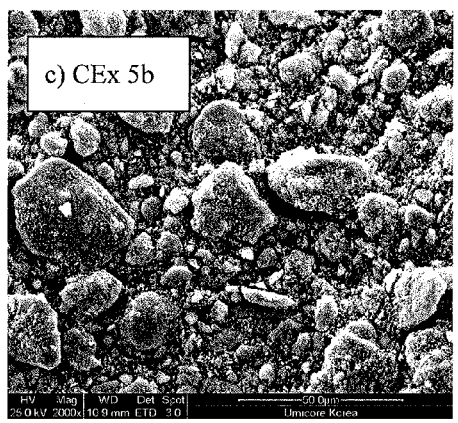
Figure 8:
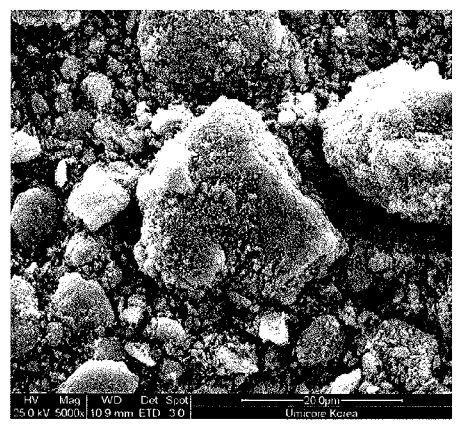
Figure 9:
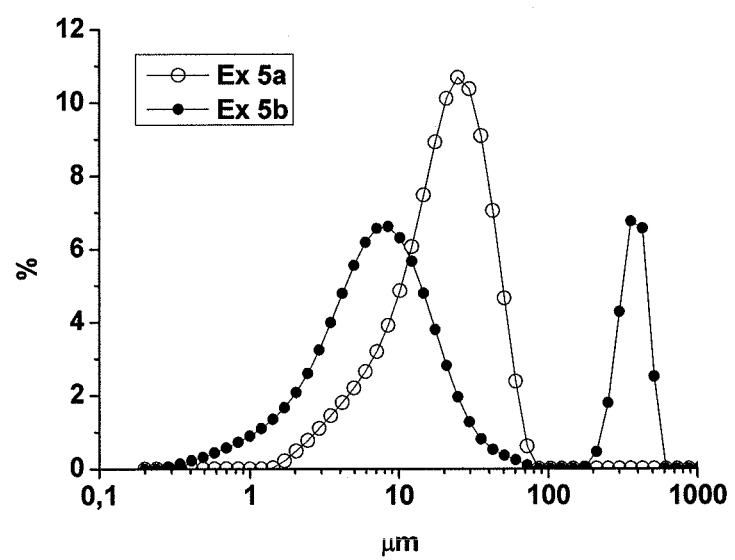
FIG. 9 is a graph illustrating the particle size distributions measured by laser diffraction in dry medium of Examples 5a and 5b.

SEM images of LCO-5 and Example 5a and CEx 5b are displayed on FIG. 8 (each time two different magnifications). The morphologies of the products are very different. LCO-5 has non agglomerated particles with a smooth surface, whereas Ex. 5a exhibits a particular island coating at the surface of the $LiCoO_2$ particles. The SEM image of CounterEx 5b clearly illustrates that ball rolling treatment breaks up the island-coated particles. The particle size distributions measured by laser diffraction in dry medium of Ex 5a and 5b are illustrated on FIG. 9. The particle size distribution of the ball milled sample shows a dramatic decrease of the mean particle size, from 23 μm to 10 μm, and clearly confirms the increase of fine particle fraction. The ball milled process indisputably breaks particles resulting in a substantial exposure of the core material. This core material has an electrical conductivity comparable to the untreated LCO-5. Hence it is shown that the core of Ex. 5a has a conductivity >$1*10^{-3}$ S/cm, whilst the shell has a conductivity lower than $1*10^{-7}$ S/cm. The PSD also shows a small amount of large particles originating from loose agglomerates of the relatively sticky powder.

The electrical conductivity of Ex 5a under an applied pressure of 63 MPa at 25° C. is measured to be $7.13*10^{-8}$ S/cm, which is 6 orders of magnitude lower than the uncoated LCO-5. Ball milled CounterEx 5b features an increase of 5 orders of magnitude of the conductivity compared to 5a. This result brings evidence supporting the higher electrical conductivity of the core compared to the shell.

Coin cells testing performances and electrical conductivity of Ex 5a and CEx5b and LCO-5 are listed in Table 7. As previously shown in Examples 1 and 2, the capacity and energy fading of Ex 5a (between 3.0 and 4.5 V) are noticeably improved compared to uncoated LCO-5 where at the same time the electrical conductivity is decreased. The electrochemical performances of CounterEx 5b sample are substantially impaired, which we believe is caused by the disappearance of the electron insulating shell structure.

COUNTER EXAMPLE 6

This example illustrates that prior art transition-metal-based oxide cathode materials cannot achieve a low electrical conductivity and good high voltage stability at the same time. The electrical conductivity and electrochemical performances of several commercially available products (from Umicore, Korea) are summarized in Table 8. These materials have a general composition $Li_{1+x}M_{1-x}O_2$ with x≅0.05 with M=$Ni_{0.5}Mn_{0.3}Co_{0.2}$ for CounterEx 6a, M=$Ni_{1/3}Mn_{1/3}Co_{1/3}$ for CounterEx 6b, and M=$Ni_{0.8}Co_{0.15}Al_{0.05}$ for CounterEx 6c. It is generally accepted that the electrical conductivity of $LiCoO_2$ is highly sensitive to its lithium stoichiometry and increases with lithium excess. In Levasseur, Thesis #2457, Bordeaux 1 University, 2001, it is reported that there is a difference of two orders of magnitude in the electrical conductivity at room temperature between the lithium overstoichiometric and stoichiometric $LiCoO_2$. M. Ménétrier, D. Carlier, M. Blangero, and C. Delmas, in Electrochemical and Solid-State Letters, 11 (11) A179-A182 (2008), reported a preparation method to elaborate highly stoichiometric $LiCoO_2$. The preparation of this highly stoichiometric $LiCoO_2$ sample is repeated and is being used to prepare CounterEx 6d.

TABLE 8

Electrical conductivity and
electrochemical performances of CounterEx 6a-d.

| | Transition metal composition | Capacity fading 1 C (%) | Energy fading 1 C (%) | Electrical conductivity (S·cm$^{-1}$) | Pressed density (g/cm$^3$) |
|---|---|---|---|---|---|
| CounterEx 6a | $Ni_{0.5}Mn_{0.3}Co_{0.2}$ | 9.49 | 14.35 | $2.21*10^{-3}$ | 3.25 |
| CounterEx 6b | $Ni_{1/3}Mn_{1/3}Co_{1/3}$ | 8.63 | 11.44 | $2.03*10^{-4}$ | 3.22 |

TABLE 8-continued

Electrical conductivity and electrochemical performances of CounterEx 6a-d.

| | Transition metal composition | Capacity fading 1 C (%) | Energy fading 1 C (%) | Electrical conductivity (S · cm$^{-1}$) | Pressed density (g/cm$^3$) |
|---|---|---|---|---|---|
| CounterEx 6c | Ni$_{0.8}$Co$_{0.15}$Al$_{0.05}$ | 14.25 | 14.95 | 3.47 * 10$^{-2}$ | 3.25 |
| CounterEx 6d | Co | 48.46 | 79.44 | 1.39 * 10$^{-4}$ | 3.40 |

Additionally the pressed density was measured because a high pressed density is important for the application of cathodes in high end batteries. The pressed density of CounterEx 6a-6d is at least 0.4 g/cm$^3$ lower than the example embodiments of the present invention, making these materials unsuitable for high end batteries. The practically achievable volumetric energy density (meaning capacity achieved in the fixed volume of a fixed cell design) still remains slightly lower. In addition, these cathode materials feature electrical conductivities above 10$^{-5}$ S/cm. This is at least 2-3 orders larger than the electrical conductivity of the example cathode materials of some embodiments of the present invention.

REFERENCE EXAMPLE 7

This example demonstrates that known transition metal based oxides can have an electrical conductivity below 10$^{-5}$ S/cm and support the existence of an electrical insulating transition metal based shell.

The electrical conductivity of commercially available MnOOH (Chuo Denki Kogyo Co., noted REX 7a), commercially available TiO$_2$ (Cosmo Chemicals KA300, noted REX 7b), commercially available Fe$_2$O$_3$ (Yakuri Pure Chemicals Co., noted REX 7c) and commercially available Co$_3$O$_4$ (Umicore, noted REX 7d) is measured. The results are listed in Table 9.

TABLE 9

Electrical conductivity of Ref. Examples 7a-d.

| | Compound | Electrical conductivity (S · cm$^{-1}$) |
|---|---|---|
| REX 7a | MnOOH | 9.03 * 10$^{-8}$ |
| REX 7b | TiO$_2$ | 6.02 * 10$^{-7}$ |
| REX 7c | Fe$_2$O$_3$ | 5.33 * 10$^{-7}$ |
| REX 7d | Co$_3$O$_4$ | 5.72 * 10$^{-7}$ |

All these materials feature electrical conductivities below 10$^{-5}$ S/cm. These conductivities are in the same range as the conductivities of the electron insulating cathode material of the present invention and provide examples of a transition metal-based shell with electrical insulating behavior.

COUNTER EXAMPLE 8

This example demonstrates that it is very difficult or impossible to achieve insulating cathode materials with good performance by an inorganic coating which is not based on transition metals. LiF is a suitable example for inorganic non-transition metal coating. A dense and completely coated LiF surface can be achieved by a PVDF based preparation route. Details of the mechanism are described in WO2011/054441. A coating layer which is too thin to significantly lower the electrical conductivity already blocks the Li diffusion. The electrically insulating shell needs to have a sufficient ionic conductivity. If the shell is not transition metal based (fx. in the case of LiF coating) then the ionic conductivity is too low and the cathode does not work well.

A LiF coated LiCoO$_2$ is prepared in the following manner: a lithium cobalt oxide mass production sample is used as cathode precursor. Its composition is 1 mol % Mg doped LiCoO$_2$, having a mean particles size of 17 μm. 1000 g of this precursor powder and 10 g of PVDF powder (1 wt %) are carefully mixed using a Haensel type mixer. In a similar way another sample is prepared by using 3 times less PVDF (0.3 wt %). Final samples (of 150 g size) are prepared by a heat treatment in air. During the heat treatment at 300 and 350° C. for 9 h initially the PVDF melts, and wets the surface perfectly. Then, progressively the PVDF decomposes and the fluorine reacts with lithium to form a dense LiF layer. 1 wt % PVDF corresponds to about 3 mol % LiF.

Figure 10:
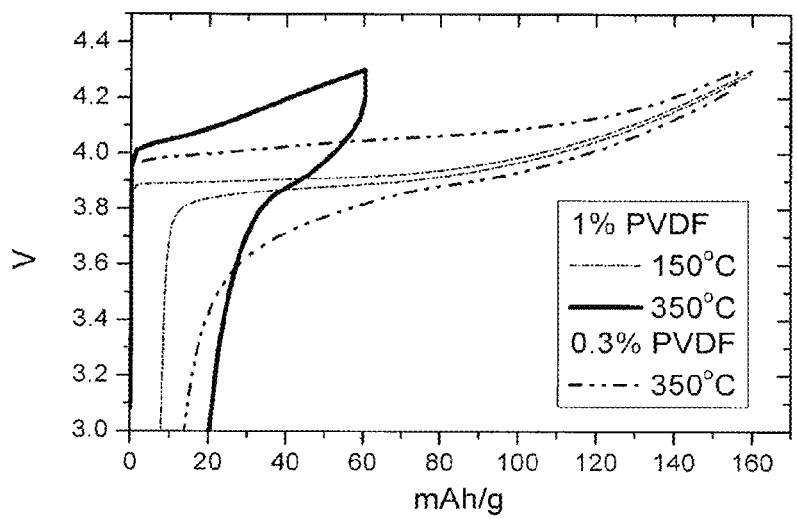
FIG. 10 is a graph showing a comparison of the first charge-discharge (C/10 rate).

The LiF layer is fully developed at 300° C. (CounterEx8b). Coin cell testing shows extremely low performance. The capacities are very small and a huge polarization is observed. These results are not the result of poor coin cell preparation (2 cells give identical results) and have been reproduced several times with other samples. If much less PVDF is used (0.3 wt %) then full capacity is achieved but the sample still shows a huge polarization (CounterEx8d). However, the coating layer is too thin or too weak to achieve the low electrical conductivity. The poor cycle data can be compared with a sample prepared at 150° C. (with 1 wt % PVDF: CounterEx8a), where the PVDF melts but no reaction to form LiF happens, and as a consequence a much higher capacity and rate performance is achieved. Table 10 summarizes the data and FIG. 10 compares the first charge-discharge (C/10 rate). Similar results can be obtained with other inorganic, transition metal free coatings as well. Obviously, the inorganic layer of LiF completely closes the surface so that no Li can penetrate across the electrolyte solid interface. The situation is completely different in the embodiments of the present invention, where the insulating shell has a high ionic conductivity as evidenced by the large rate performances.

TABLE 10

Electrochemical testing of PVDF/LiF coated LiCoO$_2$

| Counter Ex | wt % PVDF | Heating Temp. | First cycle QD (mAh/g) | Rate performance 3 C (%) | Capacity fading 1 C (%) | Electrical conductivity (S · cm$^{-1}$) |
|---|---|---|---|---|---|---|
| 8a | 1% | 150° C. | 152.4 | 82.5 | 76.95 | 2.66 * 10$^{-2}$ |
| 8b | 1% | 300° C. | 69.0 | 34.0 | 300.23 | 5.25 * 10$^{-3}$ |
| 8c | 1% | 350° C. | 39.7 | 25.5 | >100 | 6.54 * 10$^{-2}$ |
| 8d | 0.3% | 350° C. | 142.2 | 61.6 | >100 | 6.11 * 10$^{-2}$ |

EXAMPLE 9

This example demonstrates that island coated magnesium and aluminum doped LiCoO$_2$—having an electronic insulating behavior—has superior cycling stability in coin cells.

Preparation of Example 9 (Ex9)

1 mol % magnesium and 1 mol % aluminum doped cobalt tetroxide (Co$_3$O$_4$) powder as precursor for LiCoO$_2$ is used (commercially available product from Umicore, Korea). Magnesium and aluminum doped LiCoO$_2$ (noted LCO-6) is obtained by means of a standard high temperature solid state synthesis by mixing the precursor with $Li_2CO_3$ to achieve an average particle size of 20 μm. Ex9 is prepared on a pilot production line by sintering LCO-6 and MOOH $Ni_{0.55}Mn_{0.30}Co_{0.15}$) in a 95:5 molar ratio and appropriate lithium carbonate addition to achieve a conductivity of less than $5*10^{-8}$ S/cm. The average particle size of Ex9 is 20 μm. In this case, the electrical conductivity under an applied pressure of 63 MPa is measured to be $4.40*10^{-8}$ S/cm. Coin cell performances of Ex9 are listed in Table 11 and show outstanding electrochemical performances.

TABLE 11

Electrical conductivity and electrochemical performances of Examples 9.

|  | Discharge capacity 0.1 C (mAh/g) | Discharge capacity 1 C (mAh/g) | Rate performance 3 C (%) | Capacity fading 1 C (%) | Energy fading 1 C (%) | Elec. conductivity (S · cm$^{-1}$) |
|---|---|---|---|---|---|---|
| Example 9 at 4.5 V | 184.2 | 178.4 | 89.93 | 4.5 | 2.9 | 4.40 * 10$^{-8}$ |
| Example 9 at 4.6 V | 215.9 | 210.2 |  | 26.0 | 24.0 | 4.40 * 10$^{-8}$ |

The pressed density is measured by applying 1.58 Ton/cm$^2$ on the as-obtained powder. The pressed density is high, 3.82 g/cm$^3$, this high value together with the good electrochemical performance, makes these cathodes good candidates for high end battery applications.

EXAMPLE 10

High Rate Capable Materials

It is admitted that high rate capable materials should combine both high electronic and ionic conductivities. The latter is usually achieved by decreasing the particle size and increasing the specific surface area (BET) of the particle allowing easier lithium diffusion within the particle. Increasing the specific surface area is however not desirable as it will result in accelerated electrolyte oxidation and safety issues, further limiting its practical applications.

This example will demonstrate that the rate performance and high voltage stability of co-sintered $LiCoO_2$, featuring smaller particle sizes than previous examples, increases when conductivity decreases, where at the same time the BET value may be below 1 m$^2$/g, and in this case even below 0.4 m$^2$/g. The enhanced performance of co-sintered $LiCoO_2$ is achieved by controlling the lithium stoichiometry.

Preparation of LCO-10: $LiCoO_2$ (noted LCO-10) is obtained by means of a standard high temperature solid state synthesis by mixing $Co_3O_4$ with $Li_2CO_3$ to achieve an average particle size of 6.1 μm.

Preparation of Examples 10: a final cathode powder material is prepared by mixing 95.3 wt % of $LiCoO_2$ (LCO-10), with 4.70 wt % of MOOH mixed transition metal oxihydroxide with $M=Ni_{0.55}Mn_{0.30}O_{0.15}$ and pre-determined amounts of $Li_2CO_3$. Examples 10a, 10b, 10c and 10d are prepared according to Table 12 and sufficiently mixed to prepare a homogeneous raw material mixture. The mixture is placed in an alumina crucible and heated at 1000° C. for 8 h under constant air flow. After cooling, the resulting powder is classified to achieve a final mean particle size of 6.6 μm. The powder properties are measured and listed in Table 13.

TABLE 12

Composition of blend for Examples 10a, 10b, 10c and 10d obtained from LCO-10. The Li/M molar ratio relates the Li addition through $Li_2CO_3$ to the transition metal content in the mixture consisting of $LiCoO_2$ (LCO-10) and MOOH with M = $Ni_{0.55}Mn_{0.30}Co_{0.15}$.

|  | $LiCoO_2$ (LCO-10) (g) | MOOH (g) | $Li_2CO_3$ (g) | Li/M molar ratio |
|---|---|---|---|---|
| Example 10a | 2808.6 | 138.4 | 53.1 | 0.0501 |
| Example 10b | 2811.2 | 138.5 | 50.3 | 0.0474 |
| Example 10c | 2813.9 | 138.6 | 47.5 | 0.0447 |
| Example 10d | 2816.5 | 138.8 | 44.8 | 0.0421 |

TABLE 13

BET and 4-probe electrical conductivity under an applied pressure of 63.7 MPa of Examples 10a, 10b, 10c and 10d obtained from LCO-10.

|  | BET (m$^2$/g) | Pressed density (g/cm$^3$) | Conductivity (S/cm) |
|---|---|---|---|
| LCO-10 | 0.379 | 3.47 | 3.34 × 10$^{-4}$ |
| Example 10a | 0.372 | 3.44 | 4.57 × 10$^{-7}$ |
| Example 10b | 0.377 | 3.45 | 2.59 × 10$^{-7}$ |
| Example 10c | 0.387 | 3.43 | 1.04 × 10$^{-7}$ |
| Example 10d | 0.383 | 3.41 | 4.54 × 10$^{-8}$ |

The cathode materials were further fitted in a coin cell for electrochemical characterization. Active material loading of cathode electrodes is around 4 mg/cm$^2$. In this example and later, the 10C and 20C rate performance has been measured at 4.4V using a specific capacity of 160 mAh/g for the determination of the discharge rate currents. The parameters of the experiments are listed below:

| Cycle number | Charge condition | Discharge condition | Test description |
|---|---|---|---|
| 1 | 4.4 V cutoff at 0.1 C | 3.0 V cutoff at 0.1 C | Voltage profile and irreversible capacity |
| 2 to 6 | 4.4 V cutoff at 0.25 C | 3.0 V cutoff at 1, 5, 10, 15 and 20 C | Rate performance evaluation at 1 C, 5 C, 10 C, 15 C and 20 C versus cycle 1 at 0.1 C |
| 7 to 56 | 4.4 V cutoff at 0.5 C | 3.0 V cutoff at 1 C | Stability test |

The following definitions are used for data analysis: Q: capacity, D: discharge, C: charge followed by a number to indicate cycle number.

the initial discharge capacity DQ1 is measured during the first cycle in the 4.4V-3.0V range at 0.1C, the rate performance is DQi/DQ1×100 with a rate of 1C for i=2, 5C for i=3, 10C for i=4, 15C for i=5 and 20C for i=6, the irreversible capacity Qirr (in %) is (CQ1−DQ1)/CQ1× 100, the capacity fade rate at 1C per 100 cycles Q fad. is (1−DQ56/DQ7)×2, and the energy fade: instead of discharge capacity QD the discharge energy (capacity×average discharge voltage) is used.

Figure 11:
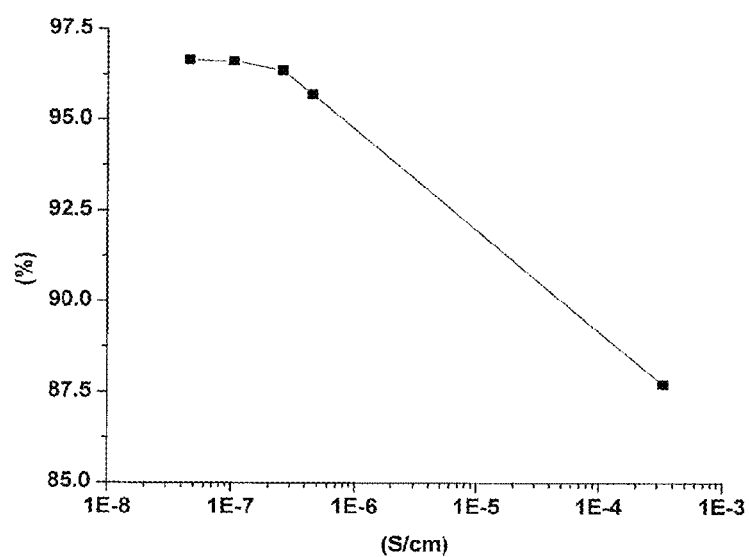
FIG. 11 is a graph showing the evolution of the 20C rate performance of Examples 10a to 10d and of LCO-10 as a function of electrical conductivity.

Table 14 summarizes the rate performances of Examples 10a to 10d and of LCO-10 at 4.4V. The evolution of the 20C rate performance of Examples 10a to 10d and of LCO-10 as function of electrical conductivity is shown on FIG. 11.

TABLE 14 active material loading and electrochemical properties at 4.4 V of examples 10a, 10b, 10c and 10d obtained from LCO-10. 20 C V is the average discharge voltage at 20 C rate.

| | Loading (mg/cm$^2$) | DQ1 4.4 V mAh/g | Qirr. (%) | 10 C (%) | 20 C (%) | 20 C V. (V) | Q fad. (%) |
|---|---|---|---|---|---|---|---|
| LCO-10 | 3.48 | 180.5 | 1.84 | 95.3 | | 3.650 | 28.2 |
| Ex 10a | 3.69 | 170.4 | 3.99 | 97.2 | 95.7 | 3.767 | 2.9 |
| Ex 10b | 3.68 | 171.2 | 3.95 | 97.5 | 96.4 | 3.768 | 2.9 |
| Ex 10c | 3.77 | 173.4 | 3.86 | 97.7 | 96.6 | 3.780 | 2.9 |
| Ex 10d | 3.71 | 174.5 | 3.82 | 98.0 | 96.6 | 3.775 | 3.0 |

It is clearly observed that for a decreasing conductivity, better 10C and 20C rate performances are obtained. The average discharge voltages at 20C of Examples 10a to 10d are also strongly increase by at least 0.1V compared to LCO-10. Materials featuring an increase of the 10C and 20C rate capacity and of the 20C average discharge voltage are highly desirable as they result in higher gravimetric energy (Wh/g) and when combined to higher pressed density, higher volumetric energy (Wh/L). Such materials, as exemplified through Examples 10a to 10d, are good candidates for applications requiring high power such as electric-powered vehicles and power tools.

The high voltage performances of Examples 10a, 10c and 10d and of LCO-10 are shown on Table 15.

TABLE 15 electrochemical properties at 4.5 V of examples 10a, 10c and 10d obtained from LCO-10. DQ7/DQ8 × 100 gives the high voltage 1 C rate performance.

| | DQ7 (mAh/g) | DQ8 (mAh/g) | DQ8/DQ7 × 100 (%) | Capacity fading 1 C (%) | Energy fading 1 C (%) |
|---|---|---|---|---|---|
| LCO-10 | 193.9 | 187.8 | 96.9 | 58.5 | 83.8 |
| Ex 10a | 186.6 | 185.3 | 99.3 | 6.2 | 6.0 |
| Ex 10c | 190.3 | 189.2 | 99.4 | 5.4 | 5.2 |
| Ex 10d | 189.5 | 188.4 | 99.4 | 4.3 | 3.9 |

Figure 12:
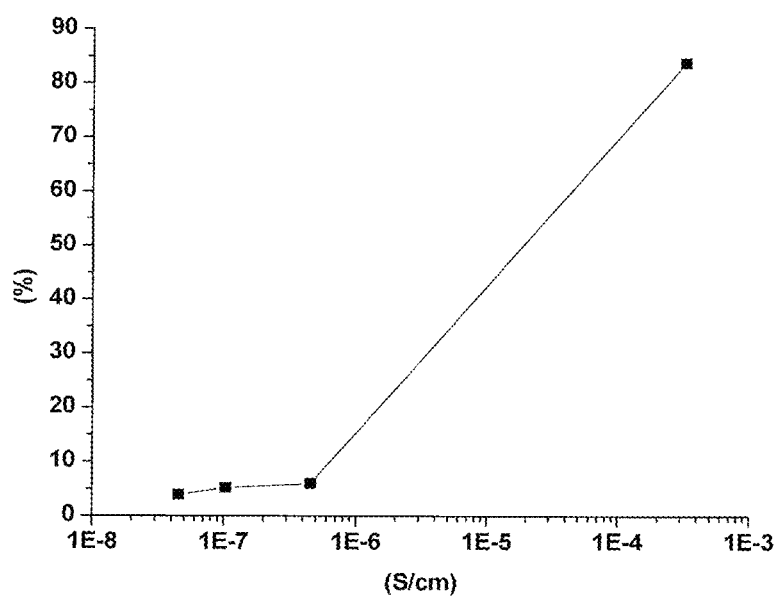
FIG. 12 is a graph illustrating the relationship between electrical conductivity and energy fading at 1C at 4.5V.

The relationship between electrical conductivity and energy fading at 1C at 4.5V is illustrated on FIG. 12. The electrical conductivity of Examples 10a to 10d is 3 to 4 orders of magnitude lower than for pristine LCO-10. The high voltage 1C rate performance, capacity fading and energy fading of Examples 10a to 10d are dramatically improved compared to LCO-10. For Examples 10a to 10d, the electrical conductivity increases upon lithium addition. At the same time, both capacity fading and energy fading are impaired. The decrease of resistivity correlates well with 4.5V stability improvements and rate performance. Examples 10a, b, c and d are insulating materials and are examples of an embodiment of the invention.

EXAMPLE 11

High Rate Capable Materials

This example will demonstrate that the rate performance and high voltage stability of co-sintered LiCoO$_2$ increases when conductivity decreases where at the same time the BET value may be below 1 m$^2$/g, and in this case even below 0.4 m$^2$/g. The enhanced performance of Example 11 is achieved by controlling the lithium stoichiometry.

Preparation of Example 11: A cathode powder material is prepared by mixing 95.3 wt % of LiCoO$_2$ (LCO-10) with 4.70 wt % of MOOH mixed transition metal oxy-hydroxide with M=Ni$_{0.55}$Mn$_{0.30}$Co$_{0.15}$. Lithium carbonate addition is determined in order to achieve a conductivity of less than 10$^{-7}$ S/cm. 50 Kg of mixture is sufficiently mixed to form a homogeneous blend, is placed in an alumina crucible and then heated at 1000° C. for 8 h under constant air flow. After cooling, the resulting powder is classified to achieve a final mean particle size of 6.6 μm. The pressed density of Example 11 is 3.4 g/cm$^3$. The powder properties are measured and listed in Table 16.

TABLE 16

BET and 4-probe electrical conductivity under an applied pressure of 63.7 MPa of Example 11 obtained from LCO-10.

| | BET (m$^2$/g) | Conductivity (S/cm) |
|---|---|---|
| LCO-10 | 0.379 | 3.34 × 10$^{-4}$ |
| Example 11 | 0.335 | 5.67 × 10$^{-8}$ |

The cathode materials were further fitted in a coin cell for electrochemical characterization. Table 17 summarizes the rate performances of Examples 11 and of LCO-10 at 4.4V.

TABLE 17 active material loading and electrochemical properties at 4.4 V of Example 11 obtained from LCO-10. 20 C V is the average discharge voltage at 20 C rate.

| | Loading (mg/cm$^2$) | DQ1 4.4 V mAh/g | Qirr. (%) | 10 C (%) | 20 C (%) | 20 C V. (V) | Q fad. (%) |
|---|---|---|---|---|---|---|---|
| LCO-10 | 3.48 | 180.5 | 1.84 | 95.3 | 87.7 | 3.650 | 28.2 |
| Ex 11 | 3.36 | 174.5 | 4.00 | 97.7 | 96.7 | 3.813 | 3.1 |

It is clearly observed that for a decreasing conductivity, better 10C and 20C rate performances are obtained. The average discharge voltages at 20C of Example 11 is also strongly increased by at least 0.16V compared to LCO-10.

The 4.6 and 4.5V high voltage performances of Example 11 are shown on Table 18. The electrical conductivity of Example 11 is 3 to 4 orders of magnitude lower than for pristine LCO-10. The high voltage 1C rate performance, capacity fading and energy fading of Example 11 is dramatically improved compared to LCO-10.

TABLE 18 electrochemical properties at 4.5 V and 4.6 V of Example 11 obtained from LCO-10. DQ7/DQ8 × 100 designs the high voltage 1 C rate performance.

| | DQ7 (mAh/g) | DQ8 (mAh/g) | DQ8/DQ7 × 100 (%) | Capacity fading 1 C (%) | Energy fading 1 C (%) |
|---|---|---|---|---|---|
| LCO-10 - 4.5 V | 193.9 | 187.8 | 96.9 | 58.5 | 83.8 |
| LCO-10 - 4.6 V | 226.3 | 219.2 | 96.8 | 118.8 | 159.1 |
| Ex 11 - 4.5 V | 191.3 | 190.7 | 99.7 | 6.1 | 6.1 |
| Ex 11 - 4.6 V | 234.0 | 233.3 | 99.7 | 48.3 | 53.9 |

The decrease of resistivity of Example 11 correlates well with the 4.6V and 4.5V stability improvements and 10C and 20C rate performance increase. Example 11 is an insulating cathode material and provides with an example of an embodiment of the invention.

While specific embodiments and/or details of the invention have been shown and described above to illustrate the application of the principles of the invention, it is understood that this invention may be embodied as more fully described in the claims, or as otherwise known by those skilled in the art (including any and all equivalents), without departing from such principles.

The invention claimed is:

1. A lithium metal oxide powder for use as a cathode material in a rechargeable battery, the metal in the powder comprising Co, Ni, and Mn and either one or more of Ti, Mg, and Al, the powder having an electrical conductivity of less than $10^{-5}$ S/cm, when pressed with 63.7 MPa at 25° C., and the powder having a reversible electrode capacity of at least 180 mAh/g, when used as an active component in a cathode which is cycled between 3.0 and 4.5 V vs. $Li^+/Li$ at a discharge rate of C/10 at 25° C., wherein the powder has the general formula x $LiCoO_2.(1-x)MO_y$, where $0.1 < x < 1$, $0.5 < y \leq 2$, and M comprises Li and M', with $M' = Ni_a Mn_b Co_c Ti_d Mg_e$, with $a+b+c+d+e=1$, and $a+b > 0.5$ and $c \geq 0$, $d \geq 0$, $e \geq 0$, and wherein the Li in M represents a quantity of moles m, with $0 \leq m/M'' \leq 0.0501$ mol/mol, wherein M'' is the quantity of transition metals in the powder, the powder consisting of a core and a shell, wherein the core comprises either $LiCoO_2$ or $LiCoO_2$ plus one or more of Ni, Mn, Al, Mg and Ti and the shell has an island-like morphology comprising a plurality of islands, wherein the islands have a formula $LiM'''O_2$ with $M''' = Ni_{m'} Mn_n Co_{1-m'-n}$, $m' \geq n$, $0.1 < m'+n \leq 0.9$, and wherein the concentration of Ni and Mn in the islands is greater than that in the core and the concentration of Co in the core is greater than that in the islands, and wherein the islands are sintered to the core.

2. A lithium metal oxide powder for use as a cathode material in a rechargeable battery, the metal in the powder comprising Co, Ni, and Mn and either one or more of Ti, Mg, and Al, the powder having an electrical conductivity of less than $10^{-5}$ S/cm, when pressed with 63.7 MPa at 25° C., and the powder having a reversible electrode capacity of at least 200 mAh/g and an energy fading inferior to 60%, when used as an active component in a cathode which is cycled between 3.0 and 4.6 V vs. $Li^+/Li$ at a discharge rate of 0.5C at 25° C., wherein the energy fade is an extrapolated value for 100 cycles based on the result after 23 cycles of the division of 1) the difference of the discharged energy of a reference cycle at 1C discharge rate before and a reference cycle at 1C discharge rate after a stability cycling test comprising 22 cycles at a discharge rate of 0.5C, by 2) the discharged energy of the reference cycle at 1C discharge rate before the stability cycling test, wherein the powder has the general formula x $LiCoO_2.(1-x)MO_y$, where $0.1 < x < 1$, $0.5 < y \leq 2$, and M comprises Li and M', with $M' = Ni_a Mn_b Co_c Ti_d Mg_e$, with $a+b+c+d+e=1$, and $a+b > 0.5$ and $c \geq 0$, $d \geq 0$, $e \geq 0$, and wherein the Li in M represents a quantity of moles m, with $0 \leq m/M'' \leq 0.0501$ mol/mol, wherein M'' is the quantity of transition metals in the powder, the powder consisting of a core and a shell, wherein the core comprises either $LiCoO_2$ or $LiCoO_2$ plus one or more of Ni, Mn, Al, Mg and Ti and the shell has an island-like morphology comprising a plurality of islands, wherein the islands have a formula $LiM'''O_2$ with $M''' = Ni_m Mn_n Co_{1-m'-n}$, $m' \geq n$, $0.1 < m'+n \leq 0.9$, and wherein the concentration of Ni and Mn in the islands is greater than that in the core and the concentration of Co in the core is greater than that in the islands, and wherein the islands are sintered to the core.

3. The lithium metal oxide powder of claim 1, comprising at least 50 mol % Co.

4. The lithium metal oxide powder of claim 1, wherein the lithium oxide powder consists of a core and a shell, and wherein at least 98 mol % of the metals in both the shell and the core comprise either the elements Li, Mn, Ni and Co, or the elements Li, Mn, Fe, Ni, Co and Ti.

5. The lithium metal oxide powder of claim 1, wherein the core has a conductivity which is higher than the conductivity of the shell.

6. The lithium metal oxide powder of claim 1, wherein the shell has an electrical conductivity being less than $1*10^{-6}$ S/cm, and wherein the conductivity of the shell is less than the conductivity of the core of the lithium metal oxide powder.

7. The lithium metal oxide powder of claim 1, consisting of cations and anions, wherein at least 93 mol % of the cations consist of Li and Co.

8. The lithium metal oxide powder of claim 1, having the general formula x $LiCoO_2.(1-x)MO_y$, where $0.1 < x < 1$, $0.5 < y \leq 2$ and M consists of Li and M', wherein $M' = Ni_a Mn_b Ti_c$, with $0 \leq c \leq 0.1$, $a > b$ and $a+b+c=1$.

9. The lithium metal oxide powder of claim 1, wherein the islands comprise at least 5 mol % of Mn.

10. The lithium metal oxide powder of claim 9, wherein the islands have a thickness of at least 100 nm and cover less than 70% of the surface of the Mn and Ni bearing $LiCoO_2$ particles.

11. The lithium metal oxide powder of claim 9, wherein the Mn concentration in the islands is at least 4 mol % higher than the Mn concentration in the core of the Mn and Ni bearing $LiCoO_2$ particles.

12. The lithium metal oxide powder of claim 9, wherein the Ni concentration in the islands is at least 2 mol % higher than the Ni concentration in the core of the Mn and Ni bearing $LiCoO_2$ particles.

13. The lithium metal oxide powder of claim 9, wherein the Mn and Ni bearing $LiCoO_2$ particles comprise at least 3 mol % of both Ni and Mn.

14. The lithium metal oxide powder of claim 9, wherein the size distribution of the Mn and Ni bearing $LiCoO_2$ particles has a d50 larger than 10 μm.

15. The lithium metal oxide powder of claim 1, comprising less than 3 mol % of one or more dopants selected from the group consisting of Al and Mg, and less than 1 mol % of one or more dopants selected from the group consisting of Be, B, Ca, Zr, S, F, and P.

16. The lithium metal oxide powder of claim 1, having a density of at least 3.5 g/cm$^3$ under application of a pressure of 1.58 Ton/cm$^2$.

17. The lithium metal oxide powder of claim 1, having a density of at least 3.7 g/cm$^3$ under application of a pressure of 1.58 Ton/cm$^2$.

18. A lithium metal oxide powder for use as a cathode material in a rechargeable battery, the metal in the powder comprising Co, Ni, and Mn and either one or more of Ti, Mg, and Al, the powder having an electrical conductivity of less than $10^{-5}$ S/cm, when pressed with 63.7 MPa at 25° C., and the powder having a 10C rate performance of at least 90%, and an energy fading inferior to 10%, when used as an active component in a cathode which is cycled between 3.0 and 4.4 V vs. $Li^+/Li$, wherein the energy fade is an extrapolated value for 100 cycles based on the result after 23 cycles of the division of 1) the difference of the discharged energy of a reference cycle at 1C discharge rate before and a reference cycle at 1C discharge rate after a stability cycling test comprising 22 cycles at a discharge rate of 0.5C, by 2) the discharged energy of the reference cycle at 1C discharge rate before the stability cycling test, wherein the powder has the general formula x $LiCoO_2.(1-x)MO_y$, where $0.1 < x < 1$, $0.5 < y \leq 2$, and M comprises Li and M', with $M' = Ni_a Mn_b Co_c Ti_d Mg_e$, with $a+b+c+d+e=1$, and $a+b > 0.5$ and $c \geq 0$, $d \geq 0$, $e \geq 0$, and wherein the Li in M represents a quantity of moles m, with $0 \leq m/M'' \leq 0.0501$ mol/mol, wherein M'' is the quantity of transition metals in the powder, and wherein the powder consists of a core and a shell, wherein the core comprises LiCoO$_2$ or LiCoO$_2$ plus one or more of Ni, Mn, Al, Mg and Ti and the shell has an island like morphology comprising a plurality of islands, wherein the islands have a formula LiM'''O$_2$ with M'''=Ni$_m$Mn$_n$Co$_{1-m'-n}$, m'≥n, 0.1<m'+n≤0.9, and wherein the concentration of Ni and Mn in the islands is greater than that in the core and the concentration of Co in the core is greater than that in the islands, and wherein the islands are sintered to the core.

19. A lithium metal oxide powder for use as a cathode material in a rechargeable battery, the metal in the powder comprising Co, Ni, and Mn and either one or more of Ti, Mg, and Al, the powder having an electrical conductivity of less than $10^{-5}$ S/cm, when pressed with 63.7 MPa at 25° C., and the powder having a 20C rate performance of at least 85%, and an energy fading inferior to 10% when used as an active component in a cathode which is cycled between 3.0 and 4.4 V vs. Li$^+$/Li, wherein the energy fade is an extrapolated value for 100 cycles based on the result after 23 cycles of the division of 1) the difference of the discharged energy of a reference cycle at 1C discharge rate before and a reference cycle at 1C discharge rate after a stability cycling test comprising 22 cycles at a discharge rate of 0.5C, by 2) the discharged energy of the reference cycle at 1C discharge rate before the stability cycling test, wherein the powder has the general formula x LiCoO$_2$.(1−x)MO$_y$, where 0.1<x<1, 0.5<y≤2, and M comprises Li and M', with M'=Ni$_a$Mn$_b$Co$_c$Ti$_d$Mg$_e$, with a+b+c+d+e=1, and a+b>0.5 and c≥0, d≥0, e≥0, and wherein the Li in M represents a quantity of moles m, with 0≤m/M"≤0.0501 mol/mol, wherein M" is the quantity of transition metals in the powder, and wherein the powder consists of a core and a shell, wherein the core comprises LiCoO$_2$ or LiCoO$_2$ plus one or more of Ni, Mn, Al, Mg and Ti and the shell has an island like morphology comprising a plurality of islands, wherein the islands have a formula LiM'''O$_2$ with M'''=Ni$_m$Mn$_n$Co$_{1-m'-n}$, m'≥n, 0.1<m'+n≤0.9, and wherein the concentration of Ni and Mn in the islands is greater than that in the core and the concentration of Co in the core is greater than that in the islands, and wherein the islands are sintered to the core.

20. The lithium metal oxide powder of claim 18, wherein the 20C rate performance is at least 92%.

21. The lithium metal oxide powder of claim 18, having an electrical conductivity of less than $10^{-7}$ S/cm.

22. The lithium metal oxide powder of claim 18, having a mean particle size of the particle size distribution less than 12 µm.

23. The lithium metal oxide powder of claim 18, having a BET surface area less than 1 m$^2$/g.

24. The lithium metal oxide powder of claim 18, having a pressed density of at least 3.2 g/cm$^3$.

25. The lithium metal oxide powder of claim 18, having an average discharge voltage greater than 3.60V when cycled at 20C-rate between 3.0 and 4.4 V vs. Li$^+$/Li.

26. An electrochemical cell comprising a cathode comprising as active material the lithium metal oxide powder of claim 1.

27. A method for preparing the lithium metal oxide powder of claim 1, comprising:
providing a mixture of LiCoO$_2$ powder and either:
a Li—Ni—Mn—Co-oxide or
a Ni—Mn—Co comprising powder, and
a Li-comprising compound, the mixture comprising more than 90 wt % of LiCoO$_2$ powder, and
sintering the mixture at a temperature T of at least 910° C. for a time t between 1 and 48 hrs,
wherein the quantity of the Li-comprising compound in the mixture is selected to obtain an insulating lithium metal oxide powder having a conductivity of less than $10^{-5}$ S/cm when pressed with 63.7 MPa at 25° C.

28. The method of claim 27, wherein the mixture comprises LiCoO$_2$ powder and either one or more of a Ni—Mn—Co hydroxide, a Ni—Mn—Co oxihydroxide, a NiMnCo oxide, a Ni—Mn—Co carbonate and a Ni—Mn—Co oxycarbonate.

29. The method of claim 27, wherein the LiCoO$_2$ powder further comprises either one or more of Al, Mg and Ti and is prepared by sintering a mixture of a doped Co precursor and a Li precursor.

30. The method of claim 27, wherein either the Ni—Mn—Co precursor powder further comprises Ti or the LiCoO$_2$ particles are doped with Ti.

31. A method for preparing the lithium metal oxide powder of claim 1, comprising:
providing a mixture of LiCoO$_2$ powder and either:
a Li—Ni—Mn—Co-oxide or
a Ni—Mn—Co comprising powder, and
a Li-comprising compound, the mixture comprising more than 90 wt % of LiCoO$_2$ powder, and
sintering the mixture at a temperature T of at least 910° C. for a time t between 1 and 48 hrs,
wherein 0≤Li/M≤0.1, where Li/M is the ratio of Li in the Li-comprising compound to the quantity of transition metals M in the mixture.

32. The method according to claim 31, wherein 0≤Li/M≤0.09.

33. The method according to claim 31, wherein 0≤Li/M≤0.0501.

34. The method according to claim 31, wherein 0≤Li/M≤0.0187.

35. The lithium metal oxide powder of claim 6, wherein the shell has an electrical conductivity being less than $1*10^{-8}$ S/cm.

36. The lithium metal oxide powder of claim 12, wherein the Ni concentration in the Mn and Ni enriched islands is at least 6 mol % higher than the Ni concentration in the core of the Mn and Ni bearing LiCoO$_2$ particles.

37. The lithium metal oxide powder of claim 13, wherein the Mn and Ni bearing LiCoO$_2$ particles comprise at least 10 mol % of both Ni and Mn.

38. The lithium metal oxide powder of claim 1, wherein the powder has an electrical conductivity of less than $10^{-7}$ S/cm, when pressed with 63.7 MPa at 25° C.

39. The lithium metal oxide powder of claim 1, wherein the powder has a reversible electrode capacity of at least 180 mAh/g, when used as an active component in a cathode which is cycled between 3.0 and 4.5 V vs. Li$^+$/Li at a discharge rate of 1C at 25° C.

40. The lithium metal oxide powder of claim 2, wherein the powder has an electrical conductivity of less than $10^{-7}$ S/cm.

41. The lithium metal oxide powder of claim 2, wherein the powder has a reversible electrode capacity of at least 200 mAh/g and an energy fading inferior to 60%, when used as an active component in a cathode which is cycled between 3.0 and 4.6 V vs. Li$^+$/Li at a discharge rate of 1C at 25° C.

42. A lithium metal oxide powder for use as a cathode material in a rechargeable battery, the metal in the powder comprising Co, Ni, and Mn and either one or more of Ti, Mg, and Al, the powder consisting of a core and a shell, wherein:
the core comprises LiCoO$_2$ or doped LiCoO$_2$ comprising between 0.1 and 1 mol % of either one or more of Al, Mg and Ti; and the shell has an island like morphology comprising a plurality of islands, wherein the islands comprise one of the following particles, which are densely sintered to the surface of the core:

a Li—Ni—Mn—Co-oxide comprising m moles of Li, or a Ni—Mn—Co comprising powder and a Li-comprising compound comprising m moles of Li;

wherein $0 \leq m/M'' \leq 0.0501$ mol/mol, $M''$ being the total molar quantity of transition metals in the lithium metal oxide powder, wherein the concentration of Ni and Mn in the islands is greater than that in the core and the concentration of Co in the core is greater than that in the islands.

* * * * *